United States Patent
Hande et al.

(10) Patent No.: US 11,770,773 B2
(45) Date of Patent: Sep. 26, 2023

(54) DUTY CYCLE CONFIGURATION FOR POWER SAVING

(71) Applicant: QUALCOMM Incorporated, San Diego, CA (US)

(72) Inventors: Prashanth Haridas Hande, San Diego, CA (US); Ravi Agarwal, San Diego, CA (US); Jafar Mohseni, San Diego, CA (US); Peter Pui Lok Ang, San Diego, CA (US); Linhai He, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/227,148

(22) Filed: Apr. 9, 2021

(65) Prior Publication Data

US 2022/0330153 A1     Oct. 13, 2022

(51) Int. Cl.
*H04W 52/02*     (2009.01)
*H04W 72/21*     (2023.01)
*H04W 72/23*     (2023.01)

(52) U.S. Cl.
CPC ... *H04W 52/0235* (2013.01); *H04W 52/0251* (2013.01); *H04W 72/21* (2023.01); *H04W 72/23* (2023.01)

(58) Field of Classification Search
CPC ......... H04W 52/0235; H04W 52/0251; H04W 72/042; H04W 72/1284; H04W 72/14; H04W 52/0216
See application file for complete search history.

(56) References Cited

U.S. PATENT DOCUMENTS

2019/0090299 A1*   3/2019   Ang ..................... H04W 28/20
2019/0281504 A1    9/2019   Su et al.
(Continued)

FOREIGN PATENT DOCUMENTS

WO   WO-2020083348 A1 *   4/2020         H04W 52/0248
WO   WO-2020204802 A1     10/2020
WO   WO-2021067703 A1 *   4/2021           H04L 5/0096

OTHER PUBLICATIONS

Liang et al., "Bandwidth Part Configuration Method and Device", Apr. 30, 2020, WO, English translation of WO 2020083348. (Year: 2020).*

(Continued)

*Primary Examiner* — Michael K Phillips
(74) *Attorney, Agent, or Firm* — Holland & Hart LLP

(57) ABSTRACT

Methods, systems, and devices for wireless communication are described related to a duty cycle configuration for power saving. A user equipment (UE) may receive control signaling indicating a duty cycle for cycling between a first power state associated with a first configuration and a second power state associated with a second configuration. In some examples, the first and second configurations may indicate a bandwidth part (BWP) configuration, restricted reception or transmission of one or more channels within the BWP configuration, or both for the UE. The UE may communicate first data traffic in accordance with the first configuration while operating in the first power state. The UE may transition from the first power state to the second power state in accordance with the duty cycle. The UE may communicate second data traffic in accordance with the second configuration while operating in the second power state.

30 Claims, 16 Drawing Sheets

(56) References Cited

U.S. PATENT DOCUMENTS

| | | | |
|---|---|---|---|
| 2020/0029316 A1* | 1/2020 | Zhou | H04W 74/0833 |
| 2020/0037248 A1 | 1/2020 | Zhou et al. | |
| 2020/0112917 A1* | 4/2020 | Nam | H04W 52/0216 |
| 2020/0260304 A1* | 8/2020 | Zhou | H04W 72/042 |
| 2020/0274750 A1 | 8/2020 | Yi et al. | |
| 2020/0314747 A1* | 10/2020 | Zhou | H04W 76/28 |
| 2021/0021397 A1* | 1/2021 | Kim | H04W 76/27 |
| 2021/0321446 A1* | 10/2021 | Lee | H04W 72/1226 |
| 2021/0336755 A1* | 10/2021 | Xiao | H04L 5/0092 |
| 2022/0167279 A1* | 5/2022 | Zhou | H04W 52/146 |
| 2022/0394671 A1* | 12/2022 | Zhang | H04B 7/0617 |

OTHER PUBLICATIONS

International Search Report and Written Opinion—PCT/US2022/070783—ISA/EPO—dated Jun. 1, 2022.

\* cited by examiner

DUTY CYCLE CONFIGURATION FOR POWER SAVING

FIELD OF TECHNOLOGY

The following relates generally to wireless communications, and more specifically to duty cycle configuration for power saving.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may operate according to a power saving mode to reduce power consumption by the UE. For example, the UE may operate according to a connected discontinuous reception (CDRX) mode, a low power bandwidth part (BWP) mode, or some other power saving modes.

SUMMARY

The described techniques relate to improved methods, systems, devices, and apparatuses that support duty cycle configuration for power saving. Generally, the described techniques provide for a user equipment (UE) to cycle between a first power state associated with a first configuration and a second power state associated with a second configuration according to a configured duty cycle, where the second power state may correspond to more power consumption by the UE than the first power state.

In some examples, the first and second configurations associated with the first and second power states may respectively indicate different bandwidth part (BWP) configurations for the UE, restrictions for reception or transmission of one or more channels within the BWP configuration for the UE, or both. The UE may receive control signaling indicating a set of duty cycle parameters for cycling between the power states. The set of duty cycle parameters may include a duty cycle parameter, an on timer parameter, an inactivity parameter, one or more other parameters, or any combination thereof. The UE may communicate first data traffic in accordance with the first configuration while operating in the first power state. The UE may transition from the first power state to the second power state in accordance with the duty cycle, and the UE may communicate second data traffic in accordance with the second configuration while operating in the second power state. The UE may transition from the second power state to the first power state in accordance with the on timer parameter, the inactivity timer parameter, or both. The UE may thereby consume less power than if the UE did not cycle between power states, and the UE may support at least some throughput of data traffic while operating in both the first power state and the second power state.

A method for wireless communication at a UE is described. The method may include receiving control signaling including an indication of a duty cycle for cycling between a first power state associated with a first configuration and a second power state associated with a second configuration, communicating, while operating in the first power state, first data traffic in accordance with the first configuration, transitioning from the first power state to the second power state after a duration in accordance with the duty cycle, and communicating, while operating in the second power state, second data traffic in accordance with the second configuration.

An apparatus for wireless communication at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to receive control signaling including an indication of a duty cycle for cycling between a first power state associated with a first configuration and a second power state associated with a second configuration, communicating, while operate in the first power state, first data traffic in accordance with the first configuration, transition from the first power state to the second power state after a duration in accordance with the duty cycle, and communicating, while operate in the second power state, second data traffic in accordance with the second configuration.

Another apparatus for wireless communication at a UE is described. The apparatus may include means for receiving control signaling including an indication of a duty cycle for cycling between a first power state associated with a first configuration and a second power state associated with a second configuration, means for communicating, while operating in the first power state, first data traffic in accordance with the first configuration, means for transitioning from the first power state to the second power state after a duration in accordance with the duty cycle, and means for communicating, while operating in the second power state, second data traffic in accordance with the second configuration.

A non-transitory computer-readable medium storing code for wireless communication at a UE is described. The code may include instructions executable by at least one processor to receive control signaling including an indication of a duty cycle for cycling between a first power state associated with a first configuration and a second power state associated with a second configuration, communicating, while operate in the first power state, first data traffic in accordance with the first configuration, transition from the first power state to the second power state after a duration in accordance with the duty cycle, and communicating, while operate in the second power state, second data traffic in accordance with the second configuration.

In some examples of the method, apparatuses, and non-transitory computer-readable medium described herein, each of the first configuration and the second configuration may specify one or more of: a BWP for a primary cell (PCell), one or more BWPs for one or more secondary cells (SCells), a dormant BWP for the PCell, a dormant BWP for the one or more SCells, restricted reception of a data channel in the BWP for the PCell, restricted reception of a control channel in the BWP for the PCell, restricted reception of the data channel in the one or more BWPs for the one or more SCells, restricted reception of the control channel in the one or more BWPs for the one or more SCells, or a combination thereof.

Some examples of the method, apparatuses, and non-transitory computer-readable medium described herein may further include operations, features, means, or instructions for receiving, via the control signaling, an on timer parameter associated with the duty cycle, starting an on timer according to the on timer parameter upon transitioning from the first power state to the second power state, and transitioning from the second power state to the first power state based on an expiration of the on timer.

Some examples of the method, apparatuses, and non-transitory computer-readable medium described herein may further include operations, features, means, or instructions for receiving, via the control signaling, an inactivity timer parameter associated with the duty cycle, starting an inactivity timer according to the inactivity timer parameter after communicating the second data traffic, and transitioning from the second power state to the first power state based on an expiration of the inactivity timer.

In some examples of the method, apparatuses, and non-transitory computer-readable medium described herein, the first power state may be associated with restricted reception of one or more of: a downlink control channel or a downlink shared channel.

In some examples of the method, apparatuses, and non-transitory computer-readable medium described herein, communicating, while operating in the first power state, the first data traffic may include operations, features, means, or instructions for transmitting the first data traffic over an uplink to a base station and pausing a monitoring of the downlink control channel and the downlink shared channel while operating in the first power state.

In some examples of the method, apparatuses, and non-transitory computer-readable medium described herein, the first configuration includes an active BWP associated with a PCell and one or more dormant BWPs associated with one or more SCells, and the first data traffic may be transmitted over the active BWP associated with the PCell.

Some examples of the method, apparatuses, and non-transitory computer-readable medium described herein may further include operations, features, means, or instructions for receiving an uplink configured grant indicating one or more sets of periodic uplink resources for transmitting the first data traffic during the first power state.

Some examples of the method, apparatuses, and non-transitory computer-readable medium described herein may further include operations, features, means, or instructions for receiving, via the downlink control channel while operating in the first power state, a first uplink grant of a set of multiple uplink grants in accordance with the first configuration, transmitting the first data traffic in accordance with the first uplink grant, and pausing a monitoring of the downlink shared channel while operating in the first power state.

In some examples of the method, apparatuses, and non-transitory computer-readable medium described herein, the first power state may be associated with restricted reception of one or more of: an uplink control channel or an uplink shared channel.

In some examples of the method, apparatuses, and non-transitory computer-readable medium described herein, communicating, while operating in the first power state, the first data traffic may include operations, features, means, or instructions for receiving the first data traffic over a downlink from a base station and pausing a transmission of the uplink control channel and the uplink shared channel while operating in the first power state.

Some examples of the method, apparatuses, and non-transitory computer-readable medium described herein may further include operations, features, means, or instructions for receiving, while operating in the first power state and the second power state, synchronization signal blocks (SSBs), transceiver reception signals, or both.

In some examples of the method, apparatuses, and non-transitory computer-readable medium described herein, the first power state may be associated with lower power consumption at the UE than the second power state.

A method for wireless communication at a base station is described. The method may include transmitting, to a UE, control signaling including an indication of a duty cycle for cycling between a first power state of the UE corresponding to a first configuration and a second power state of the UE corresponding to a second configuration, communicating first data traffic with the UE in accordance with the first configuration, and communicating, after a duration, second data traffic with the UE in accordance with the second configuration, where the duration is in accordance with the duty cycle.

An apparatus for wireless communication at a base station is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to transmit, to a UE, control signaling including an indication of a duty cycle for cycling between a first power state of the UE corresponding to a first configuration and a second power state of the UE corresponding to a second configuration, communicate first data traffic with the UE in accordance with the first configuration, and communicating, after a duration, second data traffic with the UE in accordance with the second configuration, where the duration be in accordance with the duty cycle.

Another apparatus for wireless communication at a base station is described. The apparatus may include means for transmitting, to a UE, control signaling including an indication of a duty cycle for cycling between a first power state of the UE corresponding to a first configuration and a second power state of the UE corresponding to a second configuration, means for communicating first data traffic with the UE in accordance with the first configuration, and means for communicating, after a duration, second data traffic with the UE in accordance with the second configuration, where the duration is in accordance with the duty cycle.

A non-transitory computer-readable medium storing code for wireless communication at a base station is described. The code may include instructions executable by at least one processor to transmit, to a UE, control signaling including an indication of a duty cycle for cycling between a first power state of the UE corresponding to a first configuration and a second power state of the UE corresponding to a second configuration, communicate first data traffic with the UE in accordance with the first configuration, and communicating, after a duration, second data traffic with the UE in accordance with the second configuration, where the duration be in accordance with the duty cycle.

Some examples of the method, apparatuses, and non-transitory computer-readable medium described herein may further include operations, features, means, or instructions for transmitting, to the UE, an uplink configured grant indicating one or more sets of periodic uplink resources for transmitting the first data traffic and receiving, from the UE operating in the first power state, the first data traffic over an uplink in accordance with the uplink configured grant.

Some examples of the method, apparatuses, and non-transitory computer-readable medium described herein may further include operations, features, means, or instructions for transmitting, to the UE operating in the first power state and via a downlink control channel, a first uplink grant of a set of multiple uplink grants in accordance with the first configuration and receiving the first data traffic over an uplink in accordance with the first uplink grant.

DETAILED DESCRIPTION

Figure 1:
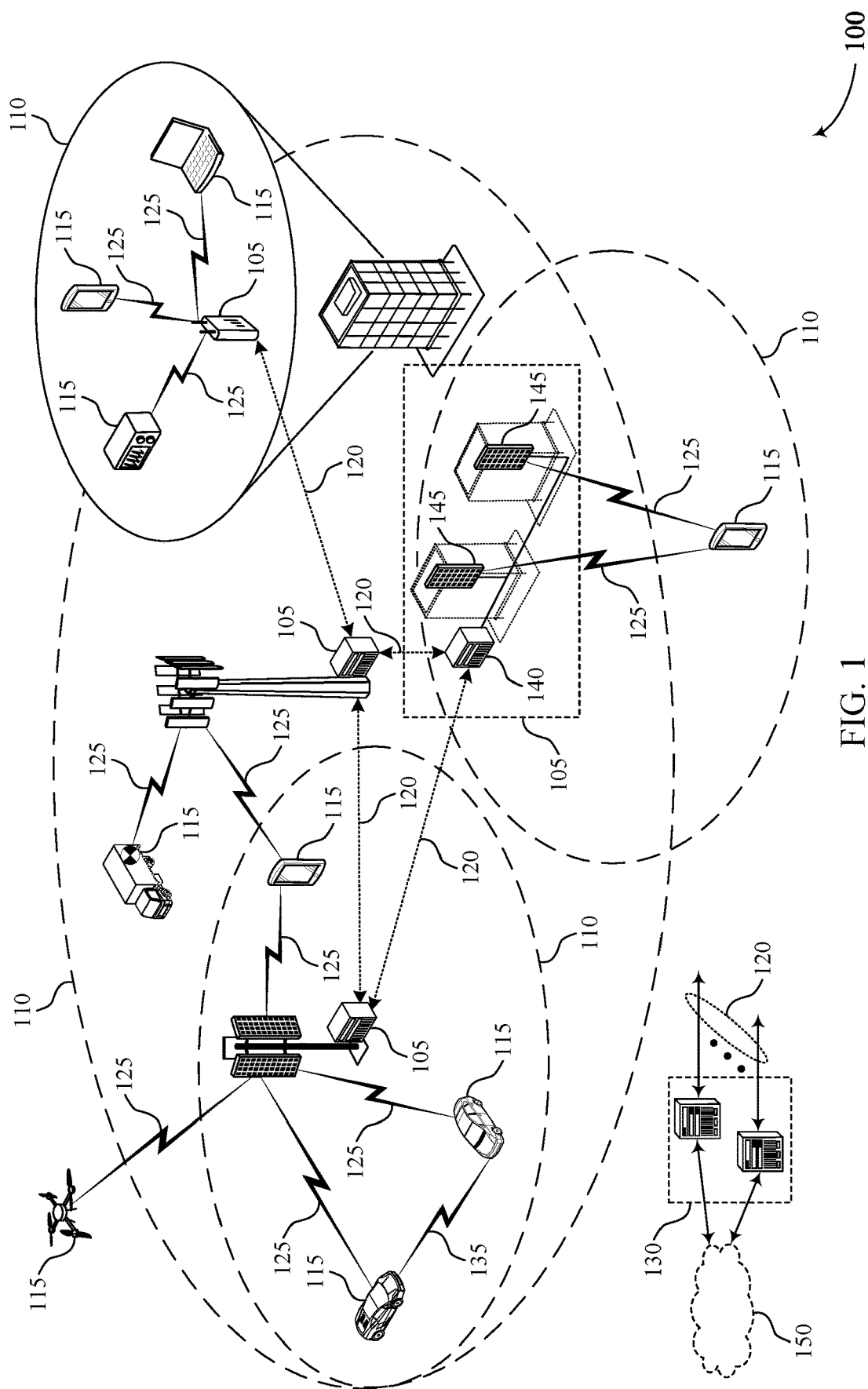
FIG. 1 illustrates an example of a wireless communications system that supports duty cycle configuration for power saving in accordance with aspects of the present disclosure.

In some wireless communications systems, communications between a user equipment (UE) and a base station may follow a somewhat regular or periodic pattern, and may occur relatively frequently. For example, some extended reality (XR) applications may be associated with relatively frequent (e.g., low latency) traffic that has a regular or periodic pattern. In such cases, a power saving operation, such as a low power bandwidth part (BWP) mode or a connected discontinuous reception (CDRX) mode, may inhibit reliable or efficient communications by the UE. For example, a periodicity of a power saving mode may not align with a periodicity of transmission or reception by the UE. Additionally or alternatively, one or more power states of the power saving mode may not support sufficient throughput of data traffic at the UE. In some examples, signaling (e.g., downlink control information (DCI)) indicating a switch between power states of a power saving mode may be associated with relatively high overhead.

As described herein, a UE may be configured with one or more duty cycle parameters for cycling between a first power state and a second power state that consumes more power than the first power state, which may support reduced power consumption by the UE while maintaining at least some throughput of data traffic at the UE. The one or more duty cycle parameters may include a duty cycle parameter, an on timer parameter, an inactivity timer parameter, or any combination thereof. The duty cycle configuration for cycling between power states may reduce overhead as compared with other power saving modes in which the UE may transition between power states in accordance with reception of control signaling (e.g., downlink control information (DCI)).

The first power state and the second power state may correspond to respective first and second configurations for communications by the UE. The first and second configurations may each indicate one or more BWPs for one or more cells (e.g., a first BWP for a primary cell (PCell) and one or more other BWPs for one or more secondary cells (SCells)), one or more dormant BWPs for the one or more cells, restricted reception or transmission of a data channel, restricted reception or transmission of a control channel, or any combination thereof. The first and second configurations may provide for a UE to communicate at least some data traffic while operating in the first power state and the second power state.

In one example, the first power state may be an uplink power state (e.g., an uplink-only power state, or an uplink-only low power state). The first configuration may indicate a first BWP (e.g., a low throughput BWP) on a PCell and a dormant BWP on one or more SCells for communications by the UE and may inhibit reception of downlink traffic via a downlink data channel, a downlink control channel, or both, by the UE, which may reduce power consumption. A base station may transmit an uplink configured grant to the UE to schedule periodic uplink transmissions by the UE. The UE may transmit uplink data during each uplink-only power state based on the uplink configured grant. Additionally or alternatively, the uplink-only power state may permit reception of an uplink grant via a downlink control channel, and the base station may transmit an uplink grant to the UE each time the UE operates in the uplink-only power state. In another example, the first power state may be a downlink power state (e.g., a downlink-only power state), an uplink and downlink power state corresponding to a reduced BWP configuration, or any other power state associated with reduced power consumption by the UE.

Aspects of the disclosure are initially described in the context of wireless communications systems. Additional aspects are described with reference to state configurations, communication timelines, and process flows. Aspects of the disclosure are further illustrated by and described with reference to apparatus diagrams, system diagrams, and flowcharts that relate to duty cycle configuration for power saving.

FIG. 1 illustrates an example of a wireless communications system 100 that supports duty cycle configuration for power saving in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, drones, robots, vehicles, meters, or the like. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs 115. MTC or IoT UEs 115 may include MTC/enhanced MTC (eMTC, also referred to as CAT-M, Cat M1) UEs, NB-IoT (also referred to as CAT NB1) UEs 115, as well as other types of UEs 115. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may cycle between a first power state associated with a first configuration and a second power state associated with a second configuration according to a configured duty cycle, where the second power state may correspond to more power consumption by the UE 115 than the first power state. A base station 105 may transmit control signaling indicating the configured duty cycle and the first and second configurations associated with the first and second power states to the UE 115. The first and second configurations may indicate a BWP configuration for the UE 115, restricted reception or transmission of one or more channels within the BWP configuration for the UE 115, or both. The base station 105 may configure the UE 115 with one or more duty cycle parameters for cycling between the power states. The duty cycle parameters may include a duty cycle parameter, an on timer parameter, an inactivity parameter, one or more other parameters, or any combination thereof. The UE 115 may communicate first data traffic in accordance with the first configuration while operating in the first power state. The UE 115 may transition from the first power state to the second power state in accordance with the duty cycle, and the UE 115 may communicate second data traffic in accordance with the second configuration while operating in the second power state. The UE 115 may transition from the second power state to the first power state in accordance with the on timer parameter, the inactivity timer parameter, or both. Communicating data traffic may include transmitting the data traffic on an uplink, receiving the data traffic on a downlink, or both. The UE 115 may thereby consume less power for communications than if the UE 115 did not cycle between power states, and the UE 115 may support at least some throughput of data traffic while operating in both the first power state and the second power state.

Figure 2:
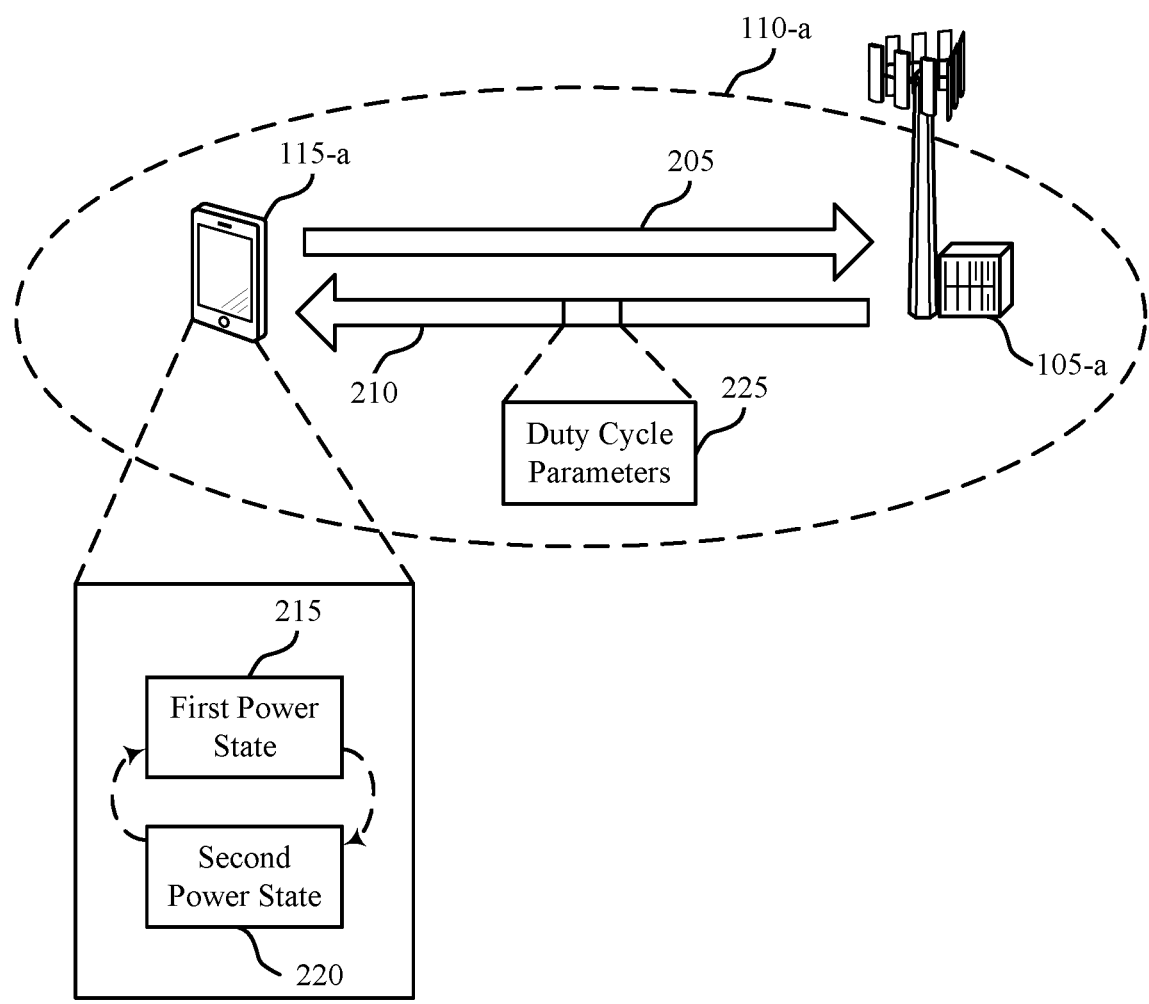
FIG. 2 illustrates an example of a wireless communications system that supports duty cycle configuration for power saving in accordance with aspects of the present disclosure.

FIG. 2 illustrates an example of a wireless communications system 200 that supports duty cycle configuration for power saving in accordance with aspects of the present disclosure. In some examples, the wireless communications system 200 may implement aspects of the wireless communications system 100. For example, the wireless communications system 200 may include a base station 105-a and a UE 115-a, which may be examples of a base station 105 and a UE 115 as described with reference to FIG. 1. Base station 105-a may provide a network coverage for UE 115-a within geographic coverage area 110-a. Base station 105-a and UE 115-a may communicate via one or more uplink communication links 205 and one or more downlink communication links 210. In some examples, UE 115-a may be configured with a duty cycle for switching between operations in a first power state 215 and a second power state 220.

In some cases, a UE 115 may support a power saving operation such as CDRX or low power BWP switching and SCell dormancy. A UE 115 that supports low power BWP switching may be configured with a first BWP configuration (e.g., a relatively low throughput BWP) and a second BWP configuration (e.g., a relatively high throughput BWP). The UE 115 may communicate uplink and downlink traffic according to the first BWP configuration and the second BWP configuration. The UE 115 may consume less power while communicating according to the first BWP configuration than the second BWP configuration (e.g., the UE 115 may operate in a low power mode due to less throughput, a smaller BWP, or both, associated with the first BWP configuration). In some examples, the first BWP configuration may include a first BWP on a PCell and one or more dormant BWPs on one or more SCells to reduce power consumption by the UE 115.

The UE 115 operating in the low power BWP switching mode may transition between power states responsive to an indication received via control signaling (e.g., DCI) from a base station 105. Although the base station 105 may match a timing of each DCI transmission to a periodicity of uplink or downlink traffic for the UE 115 (e.g., which may reduce a transition delay), the frequent DCI transmissions may be associated with increased overhead and, in some cases, increased power consumption by the UE 115. For example, the DCI may indicate a switch between BWPs and may carry a grant for the corresponding downlink traffic to be received by the UE 115 or uplink traffic to be transmitted by the UE 115 in the respective BWP, which may increase overhead. In some examples, the grant may be transmitted to the UE 115 according to the first BWP configuration (e.g., within a low power or low throughput BWP). A downlink grant received according to the first BWP configuration may increase power consumption by the UE 115. Additionally or alternatively, an uplink grant received according to the first BWP configuration may not match the corresponding uplink traffic. In some examples, a DCI transmission may indicate a BWP switch to transmit or receive data that is scheduled periodically, which may be unnecessary and may reduce a capacity of a downlink control channel (e.g., a physical downlink control channel (PDCCH) capacity).

A UE 115 that supports CDRX power saving may be configured with a set of discontinuous reception (DRX) cycles that each include a DRX on duration and an inactive duration (e.g., an off duration). The UE 115 may periodically switch between the on duration and the inactive duration according to the configured DRX cycle. The UE 115 may communicate uplink and downlink traffic during the on durations, and the UE 115 may not communicate data during the inactive durations (e.g., the UE 115 may turn off one or more uplink or downlink modems within the UE 115). In some cases, the UE 115 may transmit or receive periodic communications, and a periodicity of a DRX cycle for the UE 115 may not align with the periodicity of the communications, which may result in increased latency and reduced reliability associated with communications by the UE 115. Additionally or alternatively, because the UE 115 may turn off one or more modems for transmitting or receiving data during the inactive durations of the DRX cycle, the CDRX power saving mode may not support applications that are associated with relatively frequent transmission or reception of data.

In contrast to CDRX, as described herein, UE 115-*a* may be configured with one or more duty cycle parameters 225 for cycling between a first power state 215 and a second power state 220 that is associated with more power consumption at the UE 115 than the first power state 215. More specifically, UE 115-*a* may support reduced power consumption and periodic or relatively frequent communications while cycling between the first power state 215 and the second power state 220. The first power state 215 may correspond to a first configuration for UE 115-*a* and the second power state 220 may correspond to a second configuration for UE 115-*a*. The first and second configurations may indicate a BWP for a PCell, one or more BWPs for one or more SCells, a dormant BWP for the PCell or the one or more SCells, restricted reception or transmission of a data channel, restricted reception or transmission of a control channel, or any combination thereof. As such, when operating in the first power state 215 and the second power state 220, UE 115-*a* may support at least some data throughput (e.g., UE 115-*a* may refrain from entering a DRX OFF mode). UE 115-*a* may transition between the power states periodically based on the configured duty cycle, which may reduce overhead and improve PDCCH capacity as compared with other power saving modes that support transitioning between power states responsive to control signaling (e.g., DCI-based transitions for power saving modes such as the low power BWP switching mode).

UE 115-*a* may receive control signaling from base station 105-*a* that may include an indication of the one or more duty cycle parameters 225. The duty cycle parameters 225 may include a duty cycle parameter, an on duration parameter, an inactivity parameter, one or more other parameters, or any combination thereof. UE 115-*a* may transition to the second power state 220 periodically based on the configured duty cycle parameter (e.g., every X milliseconds (ms), where X may be based on the duty cycle).

The duty cycle parameters 225 may correspond to a periodicity of a data traffic pattern for UE 115-*a*. For example, if UE 115-*a* supports an application associated with periodic bursts of traffic, the duty cycle parameters 225 may be configured to align with the periodic data traffic. In one example, UE 115-*a* may periodically transmit relatively large uplink data packets to base station 105-*a*, and the second configuration corresponding to the second power state 220 may indicate a BWP configuration that supports the relatively large uplink data packets. As such, a duty cycle may be configured to match the periodicity of the data traffic such that UE 115-*a* may transition to the second power state 220 at each periodicity interval to perform the periodic uplink transmission.

In some cases, the periodic pattern of data traffic transmitted or received by UE 115-*a* may correspond to a frame rate of the data. Such data traffic may be quasi-periodic with a burst of data traffic in every frame (e.g., at one frame-per-second (1/fps), or two possibly staggered per frame at 1/(2*fps)). For example, the data traffic may occur every X seconds, where X may be $\frac{1}{90}$ seconds, $\frac{1}{60}$ seconds, or some other duration depending on a quantity of configured frames per second. Accordingly, the data traffic may occur in a burst periodicity of, for example, 11.111 ms. However, a duty cycle may include a granularity (e.g., a finest granularity) of one millisecond, and the start of each transition to the second power state 220 for UE 115-*a* may thereby be aligned to millisecond time boundaries, which may result in a relatively significant offset between the duty cycle and the periodic data traffic over time.

To align the duty cycle for switching between the first power state 215 and the second power state 220 with periodic data traffic for UE 115-*a*, base station 105-*a* may configure a leap cycle for UE 115-*a*. Base station 105-*a* may transmit an indication of the leap cycle to UE 115-*a* via the duty cycle parameters 225 to align the instances of the second power state 220 with the respective periodic data traffic. The leap cycle may include a longer cycle duration than other cycles within the duty cycle configuration for UE 115-*a* (e.g., every Y cycles may include a cycle duration that is one millisecond longer than the remaining cycles, where Y may be configured based on a periodicity of the data traffic, a granularity of the duty cycle, or both). As such, the leap cycle may provide for alignment of the duty cycles with the periodic data traffic over time. Additionally or alternatively, in some examples, base station 105-*a* may configure the duty cycle timer with a granularity that is less than one millisecond, such that the duty cycle timer may align with the frame rate and the periodic data traffic.

After transitioning to the second power state 220 based on the configured duty cycle, UE 115-*a* may start an on timer according to the configured on timer parameter. The on timer may indicate a time period during which UE 115-*a* may remain in the second power state 220 (e.g., a minimum on duration). UE 115-*a* may communicate second data traffic according to the second configuration while operating in the second power state 220. For example, UE 115-*a* may transmit one or more uplink transmissions, receive one or more downlink transmissions, or both. In some examples, the communications may be periodic bursts of uplink or downlink data traffic. After performing the communications, and once the on timer has expired, UE 115-*a* may transition from the second power state 220 to the first power state 215.

Additionally or alternatively, UE 115-*a* may transition from the second power state 220 to the first power state in response to an expiration of an inactivity timer according to the configured inactivity parameter. UE 115-*a* may communicate the second data traffic while operating in the second power state 220, and UE 115-*a* may start the inactivity timer after communicating the second data traffic. For example, if UE 115-*a* does not detect uplink or downlink data traffic, UE 115-*a* will start the inactivity timer. UE 115-*a* may transition from the second power state 220 to the first power state 215 in response to an expiration of the inactivity timer. In some examples, the inactivity timer may expire later than the on timer. For example, if UE 115-*a* starts the on timer and identifies more data to transmit or receive after an expiration of the on timer, UE 115-*a* may determine to ignore the expiration of the on timer. In such cases, UE 115-*a* may start the inactivity timer once UE 115-*a* does not identify more data, and UE 115-*a* may remain in the second power state 220 for a duration that is longer than the on duration. Additionally or alternatively, prior to an expiration of the on timer, UE 115-*a* may not detect data to be transmitted or received, and UE 115-*a* may start the inactivity timer. In such cases, the inactivity timer may expire before the on timer expires, and UE 115-*a* may transition from the second power state 220 to the first power state 215 according to the expiration of the inactivity timer. As such, for a configured quantity of cycles, UE 115-*a* may transition to the second power state 220 based on the duty cycle, transition from the second power state 220 to the first power state 215 based on the on timer or the inactivity timer, and repeat.

The first configuration for the first power state 215 and the second configuration for the second power state 220 may configure UE 115-*a* with one or more communication parameters. The communication parameters may include a first BWP for a PCell, one or more BWPs for one or more SCells, a dormant BWP for the PCell, one or more dormant BWPs for the one or more SCells, restricted reception or transmission of a data channel in the BWP for the PCell or the one or more BWPs for the one or more SCells, restricted reception or transmission of a control channel in the BWP for the PCell or the one or more BWPs for the one or more SCells, or any combination thereof. UE 115-*a* may consume less power for communications in the first power state 215 according to the first configuration than for communications in the second power state 220 according to the second configuration, and both the first configuration and the second configuration may support at least some throughput of data traffic at UE 115-*a*. In some examples, UE 115-*a* may reduce power consumption by turning off one or more modems (e.g., transmission or reception circuitry) that are not used by UE 115-*a* for communications according to the first configuration while operating in the first power state 215. As such, the first power state 215 may provide for UE 115-*a* to support one or more applications that are associated with relatively stringent latency requirements (e.g., periodic low latency power constrained traffic (LLPCT), or traffic for other applications associated with relatively frequent transmission or low latency) while reducing power consumption.

Table 1 illustrates some example communication parameter configurations indicated by the first configuration for the first power state 215 (e.g., a low power state) and the second configuration for the second power state 220 (e.g., a high power state), according to various embodiments. In some examples, the configurations illustrated in Table 1 may be referred to as BWP configurations for UE 115-*a*.

TABLE 1

BWP Configurations for UE Power States

| | Example Use Case |
|---|---|
| Low Power States | |
| Normal BWP on PCell and dormant BWP on S Cells | Reduced PCell bandwidth (e.g., 520 MHz) |
| Low power BWP on PCell and dormant BWP on S Cells | Small amounts of uplink and downlink traffic as compared with burst data |
| Low power BWP on PCell and some SCells | Interference avoidance with small amounts of uplink and downlink traffic. |
| High Power States | |
| Normal BWP on PCell and SCells | Large periodic bursts of data |
| Normal BWP on PCell and dormant BWP on SCells | Periodic bursts of data |
| Low power BWP on PCell and normal BWP on an SCell | Interference avoidance with periodic bursts of data |

Although Table 1 illustrates three example BWP configurations and potential use cases for the first power state 215 and three example BWP configurations and potential use cases for the second power state 220, it is to be understood that a UE 115, such as UE 115-*a*, may be configured to support any quantity of power states (e.g., low and high power states), where each of the first power state 215 and the second power state 220 may include any combination of BWP sizes and quantities of BWPs on any quantity of cells.

In some examples, the first configuration, the second configuration, or both, may indicate restricted reception or transmission of a single type of data traffic (e.g., uplink or downlink data traffic) or multiple types of data traffic to flexibly allocate modem power states for the UE 115 and to reduce power consumption by the UE 115. For example, a configuration for the first power state may indicate restricted reception of a downlink shared channel, a downlink control channel, or both (e.g., an uplink-only power state, which may be described in further detail with reference to FIGS. 3 and 4). Additionally or alternatively, a configuration for the first power state may indicate restricted transmission of an uplink shared channel, an uplink control channel, or both (e.g., a downlink-only power state).

In some examples, the first power state 215 (e.g., and the corresponding first BWP configuration), the second power state 220 (e.g., and the corresponding second BWP configuration), or both, may be defined (e.g., pre-defined or pre-configured). Additionally or alternatively, the first power state 215 and the second power state 220 may be achieved via a RRC configuration for UE 115-*a*. For example, base station 105-*a* may transmit a RRC configuration to UE 115-*a* with one or more parameters set such that the RRC configuration may configure UE 115-*a* with either the first power state 215 and corresponding first configuration or the second power state 220 and corresponding second configuration.

A base station 105 may thereby configure a set of duty cycle parameters 225 for a UE 115 to use for periodically cycling between a first power state 215 for reduced power consumption and a second power state 220 for increased data throughput, which may efficiently reduce power consumption at a UE 115 while maintaining at least some throughput of data traffic at the UE 115. The first power state 215 and the second power state 220 may correspond to respective first and second configurations for communications by the UE 115, which may provide for reduced latency and reduced power consumption while supporting continuous throughput of at least some data traffic at the UE 115.

Figure 3:
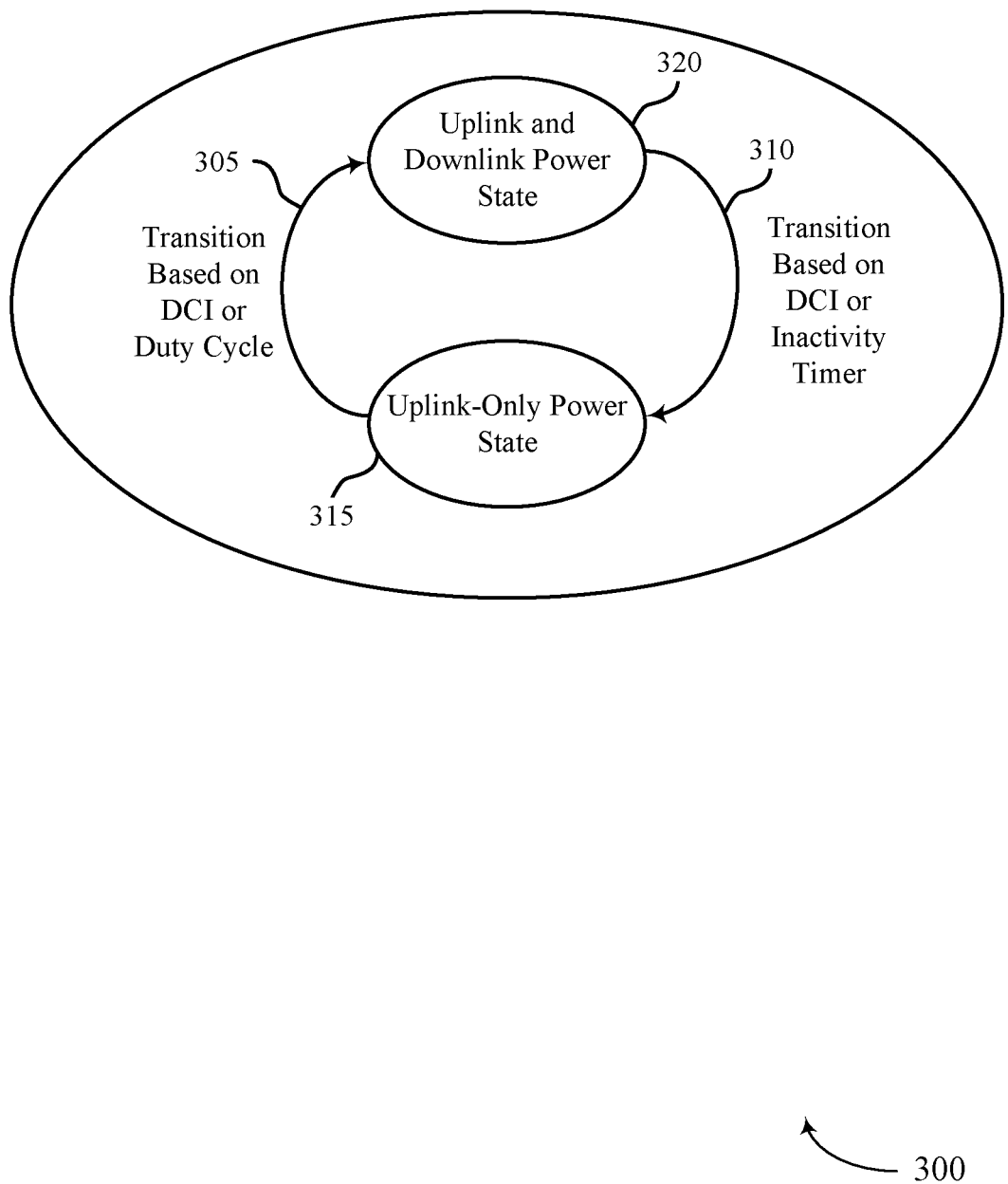
FIG. 3 illustrates an example of a state configuration that supports duty cycle configuration for power saving in accordance with aspects of the present disclosure.

FIG. 3 illustrates an example of a state configuration 300 that supports duty cycle configuration for power saving in accordance with aspects of the present disclosure. In some examples, the state configuration 300 may represent a configuration of power states for a UE 115, which may be an example of a UE 115 as described with reference to FIGS. 1 and 2. The state configuration 300 illustrates an example configuration of an uplink-only power state 315 and an uplink and downlink power state 320. The uplink-only power state 315 may be an example of the first power state 215, and the uplink and downlink power state 320 may be an example of the second power state 220, as described with reference to FIG. 2. In some examples, the uplink-only power state 315, the uplink and downlink power state 320, or both, may correspond to first and second configurations, respectively, for communications by the UE 115, which may be examples of the configurations as described with reference to FIG. 2 and Table 1.

Although the state configuration 300 illustrates a configuration of an uplink-only power state 315 and an uplink and downlink power state 320, it is to be understood that a UE 115 may be configured to cycle between any quantity of first and second power states, as described with reference to FIG. 2. For example, a UE 115 may be configured with a downlink power state (e.g., a downlink-only power state, or a downlink-only low power state) and an uplink and downlink power state, or with a first uplink and downlink power state that is associated with less power consumption by the UE 115 than a second uplink and downlink power state, or any other combination of power states.

In the example of FIG. 3, communications between the UE 115 and a base station 105 may follow a somewhat regular or periodic pattern, and may occur relatively frequently. For example, the UE 115 (e.g., an XR device) may support one or more applications (e.g., cloud gaming applications, virtual reality (VR) split rendering applications, augmented reality (AR) split computation applications, or some other applications, or any combination thereof) that may be associated with relatively frequent (e.g., low latency) uplink traffic that has a regular or periodic pattern. In some examples, the UE 115 may share computational or rendering processes with a cloud (e.g., an edge cloud), which may result in the frequent uplink transmission (e.g., frequent uplink traffic with relatively small data packet size and less frequent downlink traffic with larger data packet size).

In some examples, the UE 115 may be a wearable device (e.g., AR glasses or VR glasses), or a device in which power dissipation of the battery for the device may result in an uncomfortable user experience (e.g., due to form factors of the device). Additionally or alternatively, the UE 115 may not support a relatively long battery life (e.g., a size of the device and corresponding battery may be relatively small). Accordingly, it may be beneficial for the UE 115 to reduce power consumption while continuing frequent uplink transmission.

As described with reference to FIG. 2, a low power BWP switching mode may provide adequate power saving for the UE 115 while permitting frequent uplink transmission. However, the low power BWP switching mode may be associated with increased overhead and latency, as well as reduced downlink control channel capacity due to frequent DCI transmission. A CDRX power saving mode may provide power saving for the UE 115 without frequent DCI transmission, but may not permit transmission by the UE 115 during periodic inactive durations, which may not support applications associated with frequent uplink data transmission.

As described herein, the UE 115 may be configured to cycle between the uplink-only power state 315 and the uplink and downlink power state 320 that may be associated with more power consumption by the UE 115 than the uplink-only power state 315. The configured power states may provide for the UE 115 to perform relatively frequent uplink transmission to support such applications while reducing power consumption. For example, a first configuration for the uplink-only power state 315 may configure the UE 115 with at least a first BWP on a PCell that may permit transmission of uplink data and restrict reception of downlink data (e.g., via a physical downlink shared channel (PDSCH), a PDCCH, or both). The UE 115 may thereby support at least some throughput of uplink data while switching between the uplink-only power state 315 and the uplink and downlink power state 320, which may provide for reduced latency and increased throughput for periodic uplink transmissions as compared with some power states (e.g., DRX OFF states), in which a UE 115 may not support uplink data throughput. To reduce overhead as compared with low power BWP operations, the UE 115 may be configured to periodically switch between the uplink-only power state 315 and the uplink and downlink power state 320 according to one or more duty cycle parameters, as described with reference to FIG. 2.

The first configuration associated with the uplink-only power state 315 (e.g., an uplink-only low power state) may configure the UE 115 with a first BWP on a PCell and one or more dormant BWPs on one or more SCells. In some examples, the first BWP bandwidth on the PCell may be configured to match a quantity of uplink traffic to be transmitted by the UE 115 during the uplink-only power state 315. The first configuration may permit transmission of uplink data (e.g., physical uplink shared channel (PUSCH) transmission, physical uplink control channel (PUCCH) transmission, or both) within the first BWP and may not support reception of a downlink data channel (e.g., reception of downlink data via a PDSCH) a downlink control channel (e.g., reception of control information via a PDCCH), or both, within the first BWP.

The UE 115 may turn off one or more modems that are configured for reception of downlink data (e.g., a PDCCH reception circuit, a PDSCH reception circuit, or both) to reduce power consumption while operating in the uplink-only power state 315. As such, due to the restricted reception of downlink data the first configuration for the uplink-only power state 315 may provide for less power consumption by the UE 115 than the BWP configurations for a first power state as discussed with respect to table 1. In some examples, the UE 115 may continue to monitor for and receive some control signals, such as synchronization signal blocks (SSBs) and transceiver reception signals, while operating in the uplink-only power state 315 to maintain physical layer control loops for the UE 115.

A base station may schedule uplink communications for the UE 115 during the uplink-only power state 315 via an uplink configured grant, one or more uplink grants, or both. In a first example, the base station may configure periodic uplink data transmissions by the UE 115 via an uplink configured grant. After receiving the uplink configured grant, the UE 115 may or may not receive other uplink grants while operating in the uplink-only power state 315 (e.g., the uplink-only power state 315 may not permit reception of grants or other control information received via a downlink control channel). Additionally or alternatively, in a second example, the first configuration for the uplink-only power state 315 may permit reception of one or more uplink grants by the UE 115 via the first BWP on the PCell (e.g., the uplink-only power state 315 may permit PDCCH reception). If reception of a downlink control channel is permitted, the UE 115 may receive an uplink grant to schedule uplink communications by the UE 115 each time the UE 115 transitions to the uplink-only power state 315 (e.g., dynamic uplink grants).

The uplink and downlink power state 320 may be an example of a second power state 220 as described with reference to FIG. 2. The UE 115 may consume more power while operating in the uplink and downlink power state 320 than in the uplink-only power state 315. In some examples, the uplink and downlink power state 320 may permit more data throughput, may configure more BWPs, may configure larger BWP sizes, may support communications via more cells, or any combination thereof, than the uplink-only power state 315. Additionally or alternatively, the uplink and downlink power state 320 may permit reception of downlink traffic and transmission of uplink traffic by the UE 115 within the configured BWPs. In the example of the state configuration 300, the UE 115 may transmit periodic uplink data while operating in both the uplink-only power state 315 and the uplink and downlink power state 320, and the UE 115 may receive downlink data (e.g., relatively large downlink data bursts, or other downlink data packets) while operating in the uplink and downlink power state 320. The state configuration 300 may thereby provide for the UE 115 to support applications associated with relatively frequent or periodic uplink transmission, such as XR applications, LLPCT applications, or other applications.

As described with reference to FIG. 2, the UE 115 may be configured with a set of one or more duty cycle parameters for performing the transition 305 from the uplink-only power state 315 to the uplink and downlink power state 320 and the transition 310 from the uplink and downlink power state 320 to the uplink-only power state 315. The duty cycle parameters may include a duty cycle parameter, an on timer parameter, an inactivity timer parameter, or any combination thereof. The UE 115 may perform the transition 305 from the uplink-only power state 315 to the uplink and downlink power state 320 based on the duty cycle parameter (e.g., the UE 115 may transition 305 every X ms, where X may correspond to the duty cycle parameter). The UE 115 may perform the transition 310 from the uplink and downlink power state 320 to the uplink-only power state 315 according to the on timer parameter, the inactivity timer parameter, or both. By transitioning between power states periodically according to the duty cycle parameters, the UE 115 may reduce overhead and increase control channel capacity as compared with transitioning based on control signaling received from a base station.

In some examples, the UE 115 may perform transition 305, transition 310, or both, in response to receiving DCI. If the UE 115 is configured with the duty cycle parameters, the DCI may indicate an earlier or later transition 305 or transition 310 than the duty cycle parameters. For example, a base station 105 may transmit DCI to the UE 115 to indicate the UE 115 should perform the transition 305 earlier than the configured duty cycle.

In some examples, the uplink-only power state 315 (e.g., and the corresponding first configuration), the uplink and downlink power state 320 (e.g., and the corresponding second configuration), or both, may be configured for the UE 115 (e.g., pre-defined or pre-configured). Additionally or alternatively, the UE 115 may operate in the uplink-only power state 315, the uplink and downlink power state 320, or both, based on a RRC configuration. For example, a base station 105 may transmit a RRC configuration to the UE 115 indicate the power states. To configure the UE 115 to operate in the uplink-only power state 315 and communicate uplink data according to an uplink configured grant (e.g., an uplink configured grant only power state), one or more uplink configured grant parameters may be set in the RRC configuration. The uplink configured grant parameters may be set based on a periodicity of the uplink traffic by the UE 115, sizes of uplink data traffic bursts, or both. In some examples, the RRC configuration may disable retransmissions (e.g., a parameter, such as drx-RetransmissionTimerUL may be set to zero in the RRC configuration).

In such cases, the RRC configuration may instruct the UE 115 to wake up to transmit uplink data regardless of a current state of the UE 115 (e.g., a current CDRX state, power state, or other state). In some examples, an uplink modem (e.g., a PUSCH channel modem) of the UE 115 may be powered on to transmit the uplink data. The UE 115 may transition back to a previous state (e.g., a CDRX state, or some other state) after transmitting the uplink data due to the disabled retransmissions (e.g., irrespective of a HARQ timer value, such as drx-HARQ-RTT-TimerUL). In some examples, if the uplink data transmitted by the UE 115 is associated with one or more reliability constraints, the UE 115 may choose a relatively conservative modulation and coding scheme (MCS) for the uplink transmission to improve reliability of the transmission (e.g., without receiving feedback or performing a retransmission). If the uplink data packet is relatively small, the overhead associated with the MCS may be relatively small. If the UE 115 is configured to operate in a CDRX mode, the RRC configuration may not affect a periodicity of the CDRX cycles. For example, a CDRX inactivity timer may not be affected by the uplink configured grant transmission. In some examples, the UE 115 may thereby transition to the uplink-only power state 315 according to a RRC configuration.

Accordingly, the uplink-only power state 315 and the uplink and downlink power state 320 may be configured such that a UE 115 may reduce power consumption while supporting applications associated with relatively frequent or periodic uplink transmission.

Figure 4:
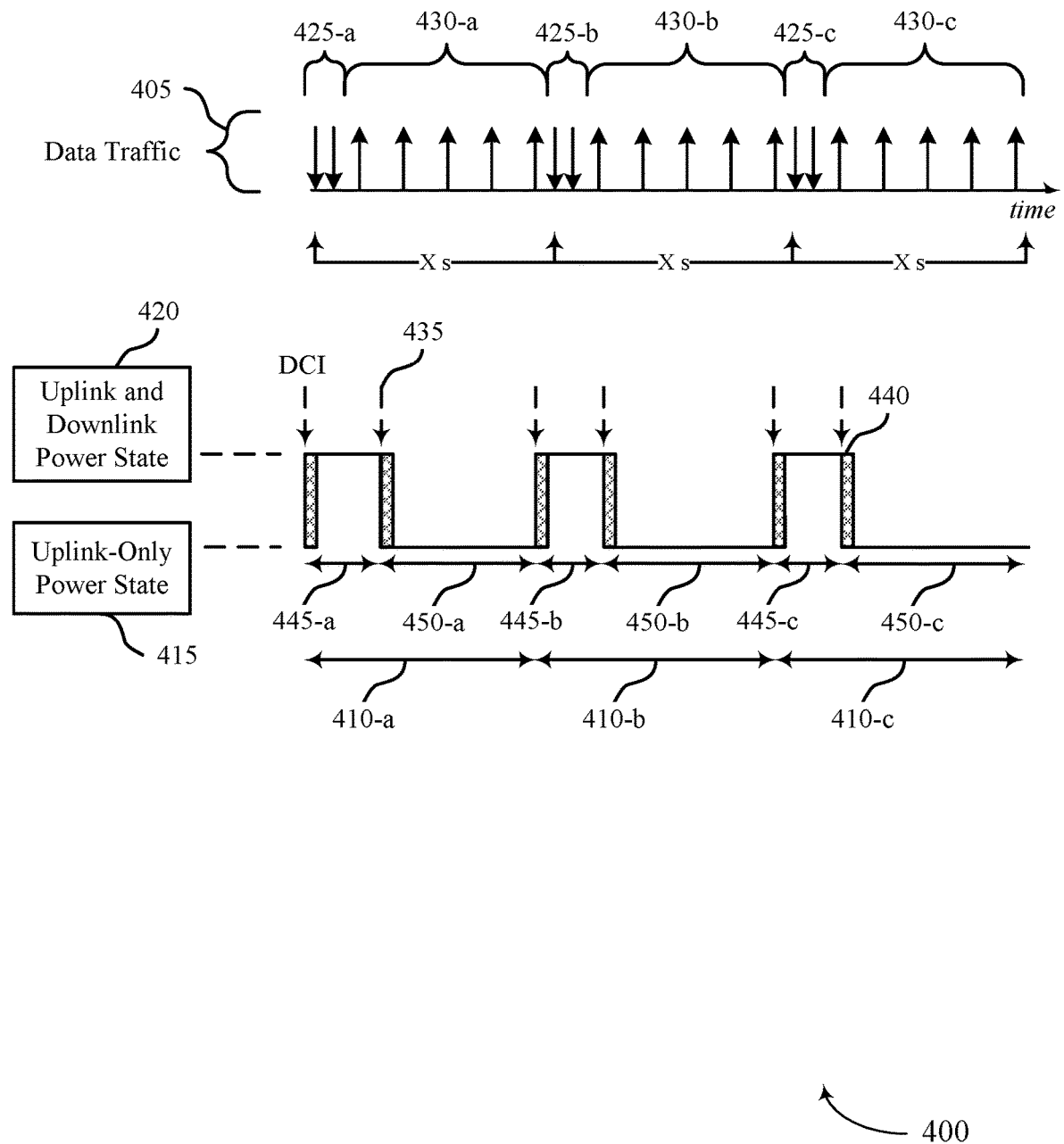
FIG. 4 illustrates an example of a communication timeline that supports duty cycle configuration for power saving in accordance with aspects of the present disclosure.

FIG. 4 illustrates an example of a communication timeline 400 that supports duty cycle configuration for power saving in accordance with aspects of the present disclosure. The communication timeline 400 may implement various aspects of the present disclosure described with reference to FIGS. 1-3. For example, the communication timeline 400 may illustrate timing for communications by a UE 115, which may be an example of a UE 115 as described with reference to FIGS. 1-3. The UE 115 may be configured to cycle between an uplink-only power state 415 and an uplink and downlink power state 420, which may be examples of an uplink-only power state and an uplink and downlink power state as described with reference to FIG. 3. In some examples, the UE 115 may be configured with one or more duty cycle parameters to periodically cycle between power states, as illustrated in the communication timeline 400. Additionally or alternatively, the UE 115 may receive control signaling, such as DCI 435, indicating a switch between power states.

Although the communication timeline 400 is described with reference to switching between an uplink-only power state 415 and an uplink and downlink power state 420, it is to be understood that the duty cycle parameters and the corresponding communication timeline 400 illustrated in FIG. 4 may correspond to any combination of power states. For example, the timing illustrated by the communication timeline 400 may be applied to any combination of first and second power states and corresponding configurations, as discussed with respect to FIG. 2 and Table 1.

The communication timeline 400 illustrates data traffic 405 received or transmitted by the UE 115 over time. As described with reference to FIG. 3, the UE 115 may support one or more applications associated with relatively frequent or periodic uplink transmission. For example, the one or more applications may be associated with the periodic uplink data traffic bursts 430 (e.g., uplink data traffic bursts 430-a, 430-b, and 430-c). Some power saving modes in which the UE 115 may enter an off state (e.g., a state associated with minimal, or no data throughput) may not support the relatively frequent uplink transmission. In some examples, each uplink data packet transmitted by the UE 115 during an uplink data traffic burst 430 may be relatively small (e.g., may be transmitted within a relatively small BWP). Accordingly, it may be beneficial to permit some throughput of uplink data traffic by the UE 115 during a reduced power mode.

As described herein and in further detail with reference to FIG. 3, the UE 115 may be configured with the uplink-only power state 415 and the uplink and downlink power state 420 to support at least some throughput of data traffic in each power state while reducing power consumption by the UE 115. The uplink-only power state 415 may correspond to a first configuration for the UE 115. The first configuration may indicate a first BWP on a PCell (e.g., a low-power BWP that supports transmission of the relatively small uplink data packets by the UE 115), one or more dormant BWPs on one or more SCells, and restricted reception of a downlink data channel, a downlink control channel, or both, to reduce power consumption by the UE 115. The UE 115 may thereby support the one or more applications associated with relatively frequent uplink transmission while reducing power consumption.

The uplink and downlink power state 320 may support transmission of the uplink data traffic bursts 430 and reception of the downlink data traffic bursts 425 (e.g., downlink data traffic bursts 425-a, 425-b, and 425-c). The uplink and downlink power state 420 may correspond to a second configuration that may indicate one or more BWPs on one or more PCells, SCells, or both. The second configuration may not indicate restricted transmission or reception of uplink or downlink data traffic.

The uplink data traffic bursts 430, the downlink data traffic bursts 425, or both, may be transmitted or received by the UE 115 according to a periodic pattern that corresponds to a frame rate of the data. Such data traffic may be quasi-periodic with a burst of data traffic in every frame (e.g., at one frame-per-second (1/fps), or two possibly staggered per frame at 1/(2*fps)). For example, the data traffic may occur every X seconds, where X may be ⅟₉₀ seconds, ⅟₆₀ seconds, or some other duration depending on a quantity of configured frames per second. Accordingly, the uplink data traffic bursts 430, the downlink data traffic bursts 425, or both may occur in a burst periodicity of, for example, 11.111 ms.

The UE 115 may be configured with one or more duty cycle parameters for cycling between power states. For example, the UE 115 may receive, via the duty cycle parameters, a duty cycle parameter, an on timer parameter, an inactivity timer parameter, or any combination thereof. The duty cycle parameters may be configured to align with the burst periodicity of the data. For example, a duty cycle period 410 may be the same as the burst periodicity. In some examples, the duty cycle period 410 may be configured with a millisecond granularity, such that the duty cycle period 410 may be slightly different from the burst periodicity. In such cases, a base station 105 may configure a leap cycle, or may configure the duty cycle period 410 according to a finer granularity, such that the duty cycle period 410 aligns with the data traffic periodicity, as described with reference to FIG. 2.

The UE 115 may operate in the uplink-only power state 415 (e.g., or another first power state, as described with reference to FIG. 2 and Table 1) for a duration 450 and operate in the uplink and downlink power state 420 (e.g., or another second power state, as described with reference to FIG. 2 and Table 1) for a duration 445 within each duty cycle period 410 based on the duty cycle parameters. The UE 115 may transition to the uplink and downlink power state 420 every X milliseconds (e.g., every duty cycle period 410) in accordance with the duty cycle parameter. The duration 450 may thereby correspond to the duty cycle parameter. The UE 115 may transition from the uplink and downlink power state 420 to the uplink-only power state 415 in accordance with an expiration of an on timer indicated by the on timer parameter, an expiration of an inactivity timer indicated by the inactivity timer parameter, or both, as described with reference to FIGS. 2-3. The duration 445 may thereby correspond to the on timer parameter, the inactivity timer parameter, or both. In some examples, a switching delay 440 may occur between each transition. The switching delay 440 may correspond to a duration of time in which the UE 115 may prepare to switch between power states (e.g., turn on or off one or more modems).

The downlink data traffic bursts 425-a, 425-b, and 425-c may align with the durations 445-a, 445-b, and 445-c, respectively, due to the alignment of the duty cycle periods 410-a, 410-b, and 410-c with the burst periodicity (e.g., a frame rate). The UE 115 may receive each downlink data traffic burst 425 while operating in the uplink and downlink power state 420 accordingly. The uplink data traffic bursts 430-a, 430-b, and 430-c may occur throughout each duty cycle period 410, such that they may align with both the durations 445 and 450. The UE 115 may transmit uplink data while operating in both the uplink and downlink power state 420 and the uplink-only power state 415, and the UE 115 may pause a reception of downlink data (e.g., a downlink shared channel, a downlink control channel, or both), while operating in the uplink-only power state 415.

In some examples, the UE 115 may receive an uplink configured grant, and the UE 115 may transmit the uplink data traffic according to the uplink configured grant. Additionally or alternatively, the uplink-only power state 415 may permit reception of a downlink control channel, and the UE 115 may receive an uplink grant during each duration 450. The dynamic uplink grants may schedule the uplink transmissions by the UE 115 for the respective duration 450.

In some examples, the UE 115 may receive DCI 435, or some other control signaling, indicating a switch between power states. For example, a base station 105 may transmit the DCI 435 to indicate that the UE should switch from the uplink-only power state 415 to the uplink and downlink power state 420 or vice versa. In some examples, the UE 115 may operate according to the configured duty cycle, and the base station 105 may transmit the DCI 435 to indicate the UE 115 should transition between power states at an earlier or later time than a time indicated by the configured duty cycle. For example, if the base station 105 has downlink data to transmit to the UE 115 during duration 450-*a*, the base station 105 may transmit DCI 435 indicating the UE 115 should switch to the uplink and downlink power state 420 earlier (e.g., the duration 445-*b* may be increased and the duration 450-*a* may be decreased). Additionally or alternatively, the base station 105 may transmit the DCI 435 for each transition between power states. If the UE 115 transitions between power states responsive to receiving DCI 435, a switching delay 440 may occur. The switching delay 440 may correspond to a duration for the UE 115 to receive and decode the DCI 435, adjust a configuration of modems of the UE 115, and transition between power states.

In some examples, the UE 115 may be configured to cycle between a first power state and a second power state that may be different from the uplink-only power state 415 and the uplink and downlink power state 420 according to the duty cycle configurations and timings illustrated by the communication timeline 400. For example, the UE 115 may cycle between a downlink power state and an uplink and downlink power state. The UE 115 may receive downlink data traffic from a base station and may pause a transmission of uplink data traffic (e.g., an uplink shared channel, an uplink control channel, or both) while operating in the downlink power state (e.g., during the durations 450). Additionally or alternatively, the UE 115 may cycle between a first power state associated with a first BWP configuration and a second power state associated with a second BWP configuration, as described with reference to FIG. 2 and Table 1. In such cases, the power states, the duty cycle parameters, or both, may be configured to support the data traffic 405 that may be received or transmitted by the UE 115. As such, a power saving mode may be configured to reduce power consumption by a UE 115 while supporting relatively frequent or periodic communications.

Figure 5:
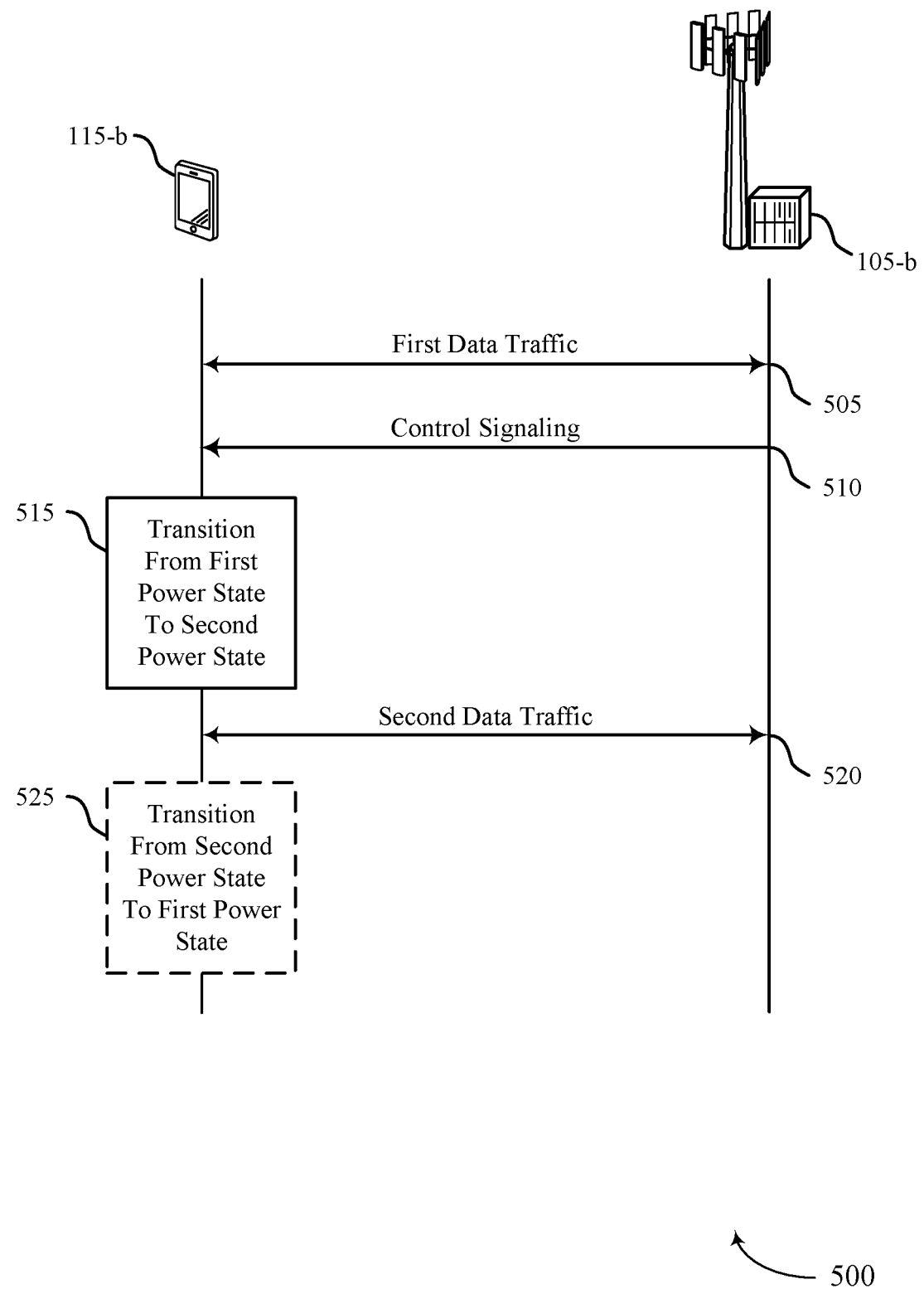
FIG. 5 illustrates an example of a process flow that supports duty cycle configuration for power saving in accordance with aspects of the present disclosure.

FIG. 5 illustrates an example of a process flow 500 that supports duty cycle configuration for power saving in accordance with aspects of the present disclosure. In some examples, the process flow 500 may implement various aspects of the present disclosure described with reference to FIGS. 1-4. The process flow 500 may include UE 115-*b* and base station 105-*b*, which may be examples of a UE 115 and a base station 105 as described with reference to FIGS. 1-4. In some examples, UE 115-*b* may be configured to periodically cycle between a first power state and a second power state in accordance with a duty cycle.

It is understood that the devices and nodes described by the process flow 500 may communicate with or be coupled with other devices or nodes that are not illustrated. For example, UE 115-*b* and base station 105-*b* may communicate with one or more other UEs 115, base stations 105, or other devices. Alternative examples of the following may be implemented, where some steps are performed in a different order than described or are not performed at all. In some cases, a step may include additional features not mentioned below, or further steps may be added.

At 505, UE 115-*b* may communicate, while operating in a first power state, first data traffic with base station 105-*b* in accordance with a first configuration. In some examples, the first data traffic may be uplink data, and communicating the first data traffic may include UE 115-*b* transmitting the first data traffic over an uplink to base station 105-*b* and pausing a monitoring of a downlink control channel and a downlink shared channel while operating in the first power state. In other examples, the first data traffic may be downlink data or control information, and communicating the first data traffic may include UE 115-*b* receiving the first data traffic over a downlink from base station 105-*b* and pausing a transmission of an uplink control channel and an uplink data channel. Additionally or alternatively, communicating the first data traffic may include transmitting and receiving the first data traffic according to the first configuration (e.g., a BWP configuration).

At 510, UE 115-*b* may receive control signaling from base station 105-*b*. The control signaling may include an indication of a duty cycle for cycling between the first power state associated with the first configuration and a second power state associated with a second configuration. In some examples, the first and second configurations may be referred to as BWP configurations. As described with reference to FIGS. 1-4, each of the first configuration and the second configuration may indicate one or more of: a BWP for a PCell, one or more BWPs for one or more SCells, a dormant BWP for the PCell, a dormant BWP for the one or more SCells, restricted reception or transmission of a data channel in the BWP for the PCell, restricted reception or transmission of a control channel in the BWP for the PCell, restricted reception or transmission of the data channel in the one or more BWPs for the one or more SCells, restricted reception or transmission of the control channel in the one or more BWPs for the one or more SCells, or any combination thereof. In some examples, the first power state and the first configuration may be associated with less power consumption at UE 115-*b* than the second power state and the second configuration.

At 515, UE 115-*b* may transition from the first power state to the second power state after a duration in accordance with the duty cycle.

At 520, UE 115-*b* may communicate, while operating in the second power state, second data traffic with base station 105-*b* in accordance with the second configuration. In some examples, the second data traffic may be downlink data traffic, uplink data traffic, or both, and communicating the second data traffic may include UE 115-*b* transmitting the second data traffic over an uplink to base station 105-*b*, receiving the second data traffic over a downlink from base station 105-*b*, or both, in accordance with the second configuration.

At 525, in some examples, UE 115-*b* may transition from the second power state to the first power state. In some examples, the control signaling may include an on timer parameter, an inactivity timer parameter or both, and UE 115-*b* may transition from the second power state to the first power state based on an expiration of an on timer in accordance with the on timer parameter or an expiration of an inactivity timer in accordance with the inactivity timer parameter.

Figure 6:
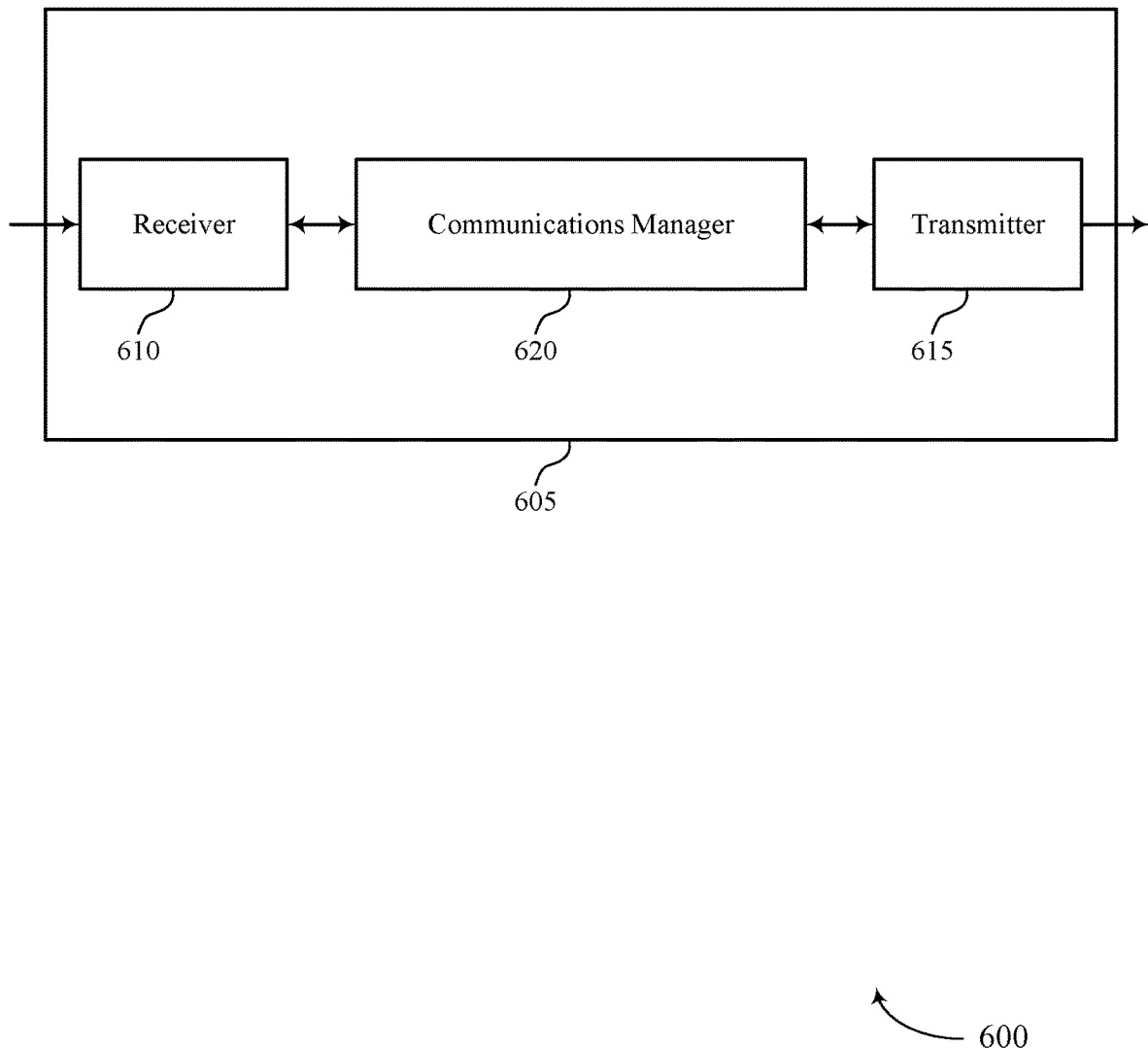
FIGS. 6 and 7 show block diagrams of devices that support duty cycle configuration for power saving in accordance with aspects of the present disclosure.

FIG. 6 shows a block diagram 600 of a device 605 that supports duty cycle configuration for power saving in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to duty cycle configuration for power saving). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to duty cycle configuration for power saving). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of duty cycle configuration for power saving as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware, software (e.g., executed by a processor), or any combination thereof. The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving control signaling including an indication of a duty cycle for cycling between a first power state associated with a first configuration and a second power state associated with a second configuration. The communications manager 620 may be configured as or otherwise support a means for communicating, while operating in the first power state, first data traffic in accordance with the first configuration. The communications manager 620 may be configured as or otherwise support a means for transitioning from the first power state to the second power state after a duration in accordance with the duty cycle. The communications manager 620 may be configured as or otherwise support a means for communicating, while operating in the second power state, second data traffic in accordance with the second configuration.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing and reduced power consumption. For example, by receiving a configuration to operate in a first power state and a second power state associated with more power consumption by the device 605 (e.g., a UE 115) than the first power state, the processor of the device 605 may reduce power consumption. While operating in the first power state, the processor may turn off one or more modems of the device 605, transmit or receive less data, or both, which may reduce processing and power consumption. Additionally or alternatively, by transitioning between power states according to a configured duty cycle, the processor may refrain from receiving and decoding control signaling, which may reduce processing.

Figure 7:
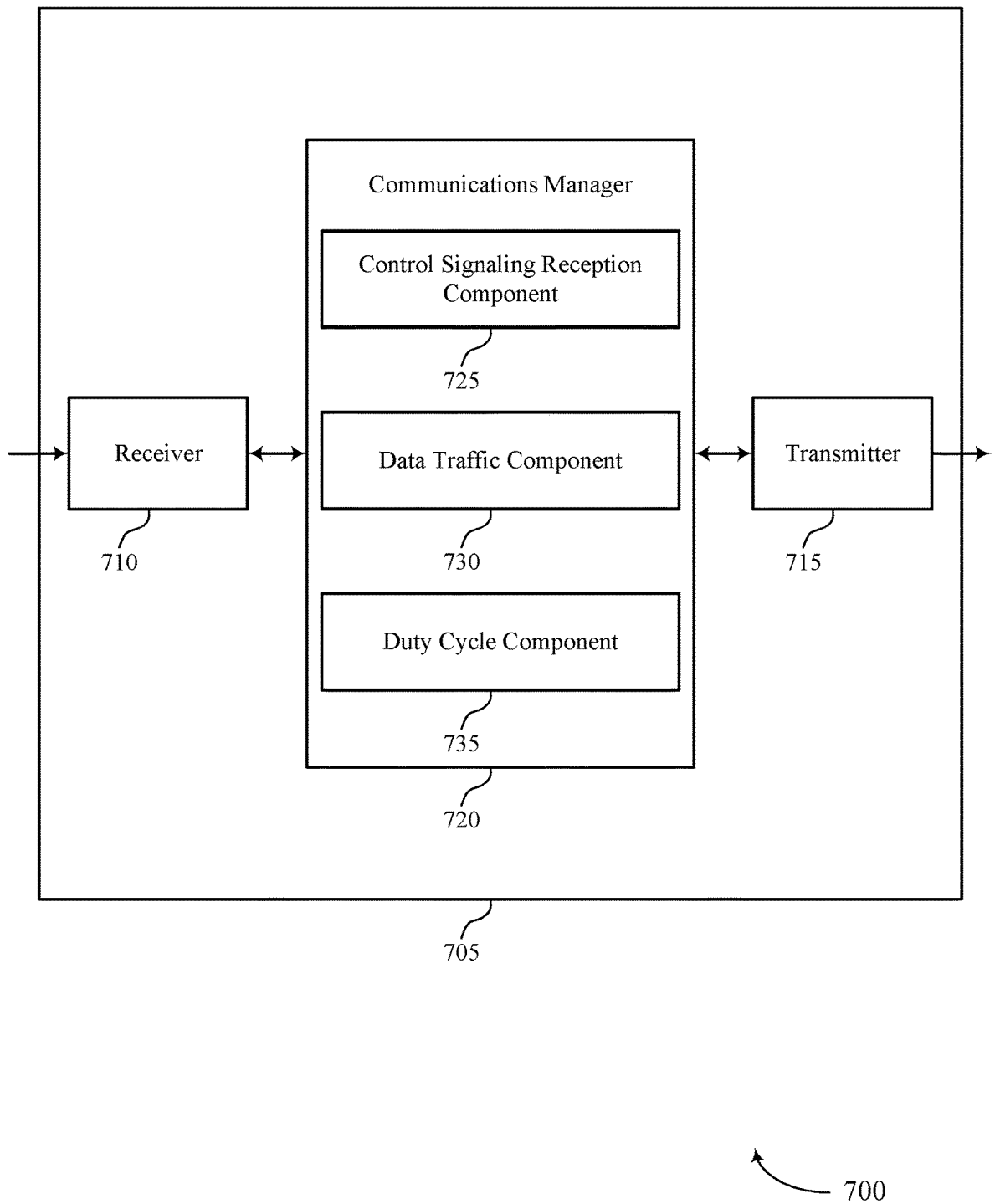

FIG. 7 shows a block diagram 700 of a device 705 that supports duty cycle configuration for power saving in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to duty cycle configuration for power saving). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to duty cycle configuration for power saving). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of duty cycle configuration for power saving as described herein. For example, the communications manager 720 may include a control signaling reception component 725, a data traffic component 730, a duty cycle component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The control signaling reception component 725 may be configured as or otherwise support a means for receiving control signaling including an indication of a duty cycle for cycling between a first power state associated with a first configuration and a second power state associated with a second configuration. The data traffic component 730 may be configured as or otherwise support a means for communicating, while operating in the first power state, first data traffic in accordance with the first configuration. The duty cycle component 735 may be configured as or otherwise support a means for transitioning from the first power state to the second power state after a duration in accordance with the duty cycle. The data traffic component 730 may be configured as or otherwise support a means for communicating, while operating in the second power state, second data traffic in accordance with the second configuration.

Figure 8:
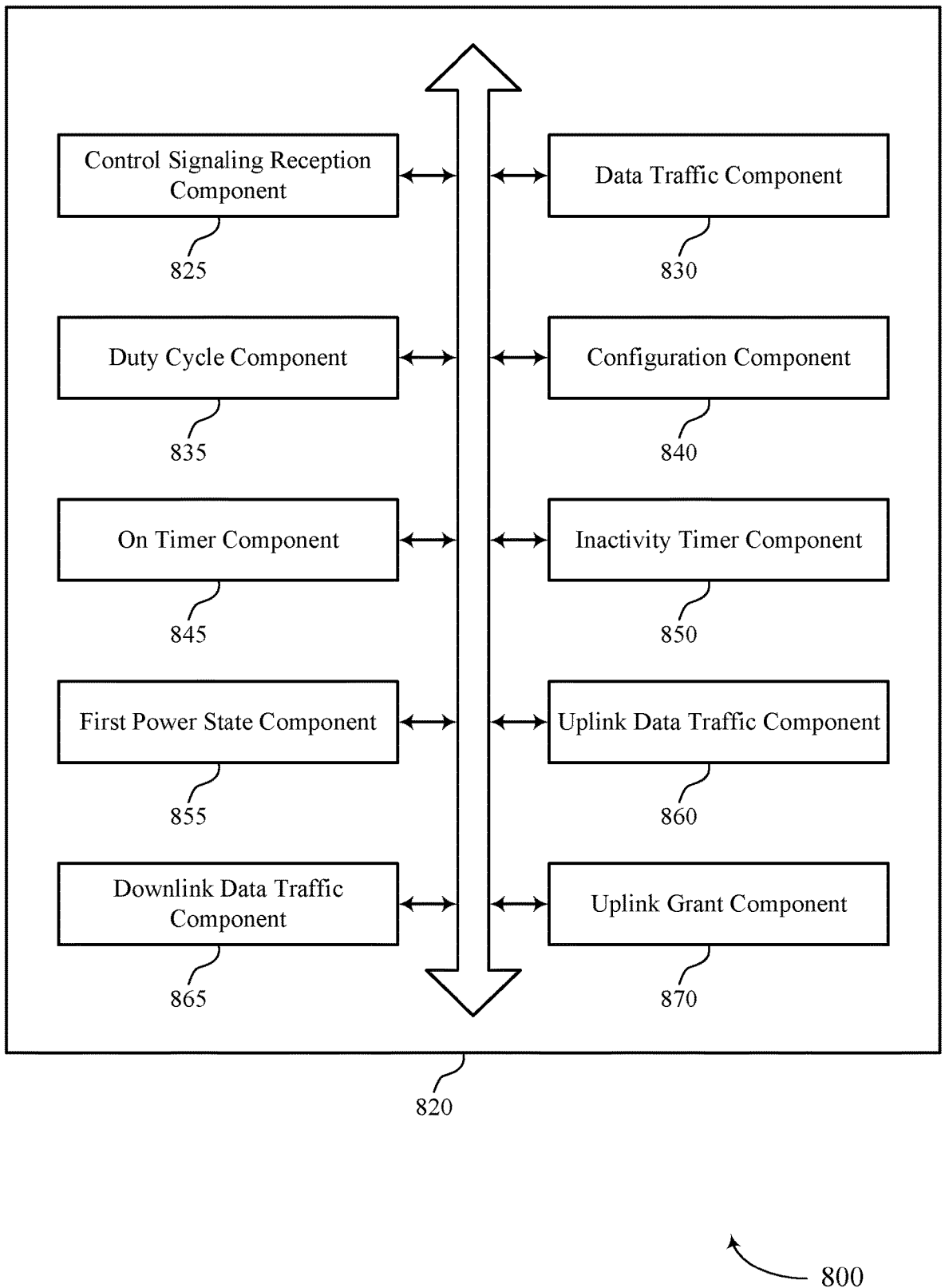
FIG. 8 shows a block diagram of a communications manager that supports duty cycle configuration for power saving in accordance with aspects of the present disclosure.

FIG. 8 shows a block diagram 800 of a communications manager 820 that supports duty cycle configuration for power saving in accordance with aspects of the present disclosure. The communications manager 820 may be an example of aspects of a communications manager 620, a communications manager 720, or both, as described herein. The communications manager 820, or various components thereof, may be an example of means for performing various aspects of duty cycle configuration for power saving as described herein. For example, the communications manager 820 may include a control signaling reception component 825, a data traffic component 830, a duty cycle component 835, a configuration component 840, an on timer component 845, an inactivity timer component 850, a first power state component 855, an uplink data traffic component 860, a downlink data traffic component 865, an uplink grant component 870, or any combination thereof. Each of these components may communicate, directly or indirectly, with one another (e.g., via one or more buses).

The communications manager 820 may support wireless communication at a UE in accordance with examples as disclosed herein. The control signaling reception component 825 may be configured as or otherwise support a means for receiving control signaling including an indication of a duty cycle for cycling between a first power state associated with a first configuration and a second power state associated with a second configuration. The data traffic component 830 may be configured as or otherwise support a means for communicating, while operating in the first power state, first data traffic in accordance with the first configuration. The duty cycle component 835 may be configured as or otherwise support a means for transitioning from the first power state to the second power state after a duration in accordance with the duty cycle. In some examples, the data traffic component 830 may be configured as or otherwise support a means for communicating, while operating in the second power state, second data traffic in accordance with the second configuration.

In some examples, each of the first configuration and the second configuration may specify one or more of: a BWP for a PCell, one or more BWPs for one or more SCells, a dormant BWP for the PCell, a dormant BWP for the one or more SCells, restricted reception of a data channel in the BWP for the PCell, restricted reception of a control channel in the BWP for the PCell, restricted reception of the data channel in the one or more BWPs for the one or more SCells, restricted reception of the control channel in the one or more BWPs for the one or more SCells, or a combination thereof.

In some examples, the on timer component 845 may be configured as or otherwise support a means for receiving, via the control signaling, an on timer parameter associated with the duty cycle. In some examples, the on timer component 845 may be configured as or otherwise support a means for starting an on timer according to the on timer parameter upon transitioning from the first power state to the second power state. In some examples, the on timer component 845 may be configured as or otherwise support a means for transitioning from the second power state to the first power state based on an expiration of the on timer.

In some examples, the inactivity timer component 850 may be configured as or otherwise support a means for receiving, via the control signaling, an inactivity timer parameter associated with the duty cycle. In some examples, the inactivity timer component 850 may be configured as or otherwise support a means for starting an inactivity timer according to the inactivity timer parameter after communicating the second data traffic. In some examples, the inactivity timer component 850 may be configured as or otherwise support a means for transitioning from the second power state to the first power state based on an expiration of the inactivity timer.

In some examples, the first power state may be associated with restricted reception of one or more of: a downlink control channel or a downlink shared channel. In some examples, to support communicating, while operating in the first power state, the first data traffic, the uplink data traffic component 860 may be configured as or otherwise support a means for transmitting the first data traffic over an uplink to a base station. In some examples, to support communicating, while operating in the first power state, the first data traffic, the downlink data traffic component 865 may be configured as or otherwise support a means for pausing a monitoring of the downlink control channel and the downlink shared channel while operating in the first power state.

In some examples, the first configuration includes an active BWP associated with a PCell and one or more dormant BWPs associated with one or more SCells. In some examples, the first data traffic may be transmitted over the active BWP associated with the PCell.

In some examples, the uplink grant component 870 may be configured as or otherwise support a means for receiving an uplink configured grant indicating one or more sets of periodic uplink resources for transmitting the first data traffic during the first power state.

In some examples, the uplink grant component 870 may be configured as or otherwise support a means for receiving, via the downlink control channel while operating in the first power state, a first uplink grant of a set of multiple uplink grants in accordance with the first configuration. In some examples, the uplink data traffic component 860 may be configured as or otherwise support a means for transmitting the first data traffic in accordance with the first uplink grant. In some examples, the downlink data traffic component 865 may be configured as or otherwise support a means for pausing a monitoring of the downlink shared channel while operating in the first power state.

In some examples, the first power state may be associated with restricted transmission of one or more of: an uplink control channel or an uplink shared channel. In some examples, to support communicating, while operating in the first power state, the first data traffic, the downlink data traffic component 865 may be configured as or otherwise support a means for receiving the first data traffic over a downlink from a base station. In some examples, to support communicating, while operating in the first power state, the first data traffic, the uplink data traffic component 860 may be configured as or otherwise support a means for pausing a transmission of the uplink control channel and the uplink shared channel while operating in the first power state.

In some examples, the first power state component 855 may be configured as or otherwise support a means for receiving, while operating in the first power state and the second power state, SSBs, transceiver reception signals, or both. In some examples, the first power state is associated with lower power consumption at the UE than the second power state.

Figure 9:
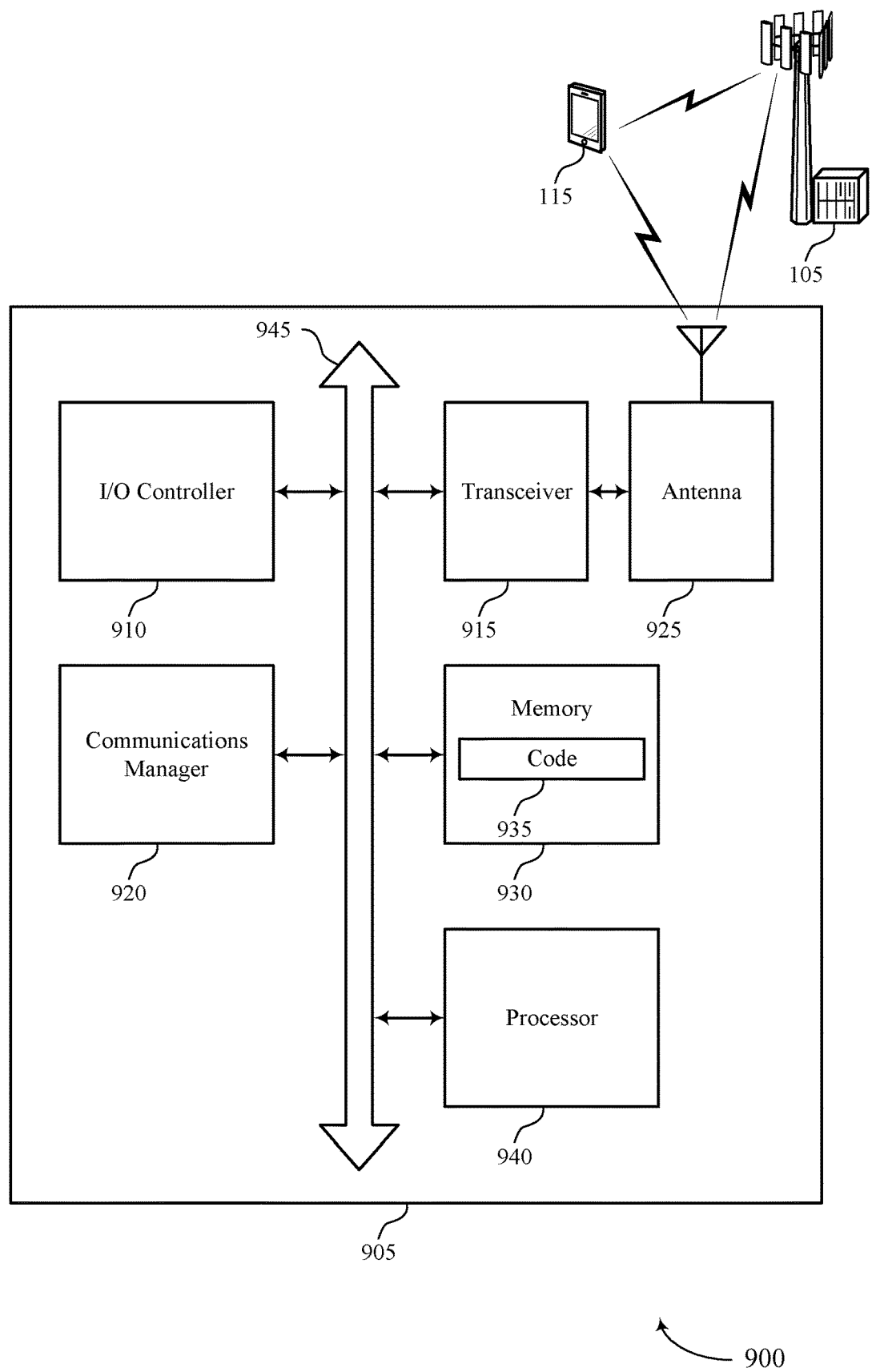
FIG. 9 shows a diagram of a system including a device that supports duty cycle configuration for power saving in accordance with aspects of the present disclosure.

FIG. 9 shows a diagram of a system 900 including a device 905 that supports duty cycle configuration for power saving in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting duty cycle configuration for power saving). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving control signaling including an indication of a duty cycle for cycling between a first power state associated with a first configuration and a second power state associated with a second configuration. The communications manager 920 may be configured as or otherwise support a means for communicating, while operating in the first power state, first data traffic in accordance with the first configuration. The communications manager 920 may be configured as or otherwise support a means for transitioning from the first power state to the second power state after a duration in accordance with the duty cycle. The communications manager 920 may be configured as or otherwise support a means for communicating, while operating in the second power state, second data traffic in accordance with the second configuration.

By including or configuring the communications manager 920 in accordance with examples as described herein, the device 905 may support techniques for reduced latency, reduced power consumption, and longer battery life. For example, the device 905 may reduce power consumption and improve battery life by cycling between a first power state and a second power state associated with more power consumption by the device 905 than the first power state according to a configured duty cycle. The first power state and the second power state may correspond to configurations that support at least some throughput of data traffic at the device 905, which may support reduced latency of communications by the device 905. The device 905 may transition between power states according to the configured duty cycle, which may reduce overhead as compared with transitioning between power states based on control signaling.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of duty cycle configuration for power saving as described herein, or the processor 940 and the memory 930 may be otherwise configured to perform or support such operations.

Figure 10:
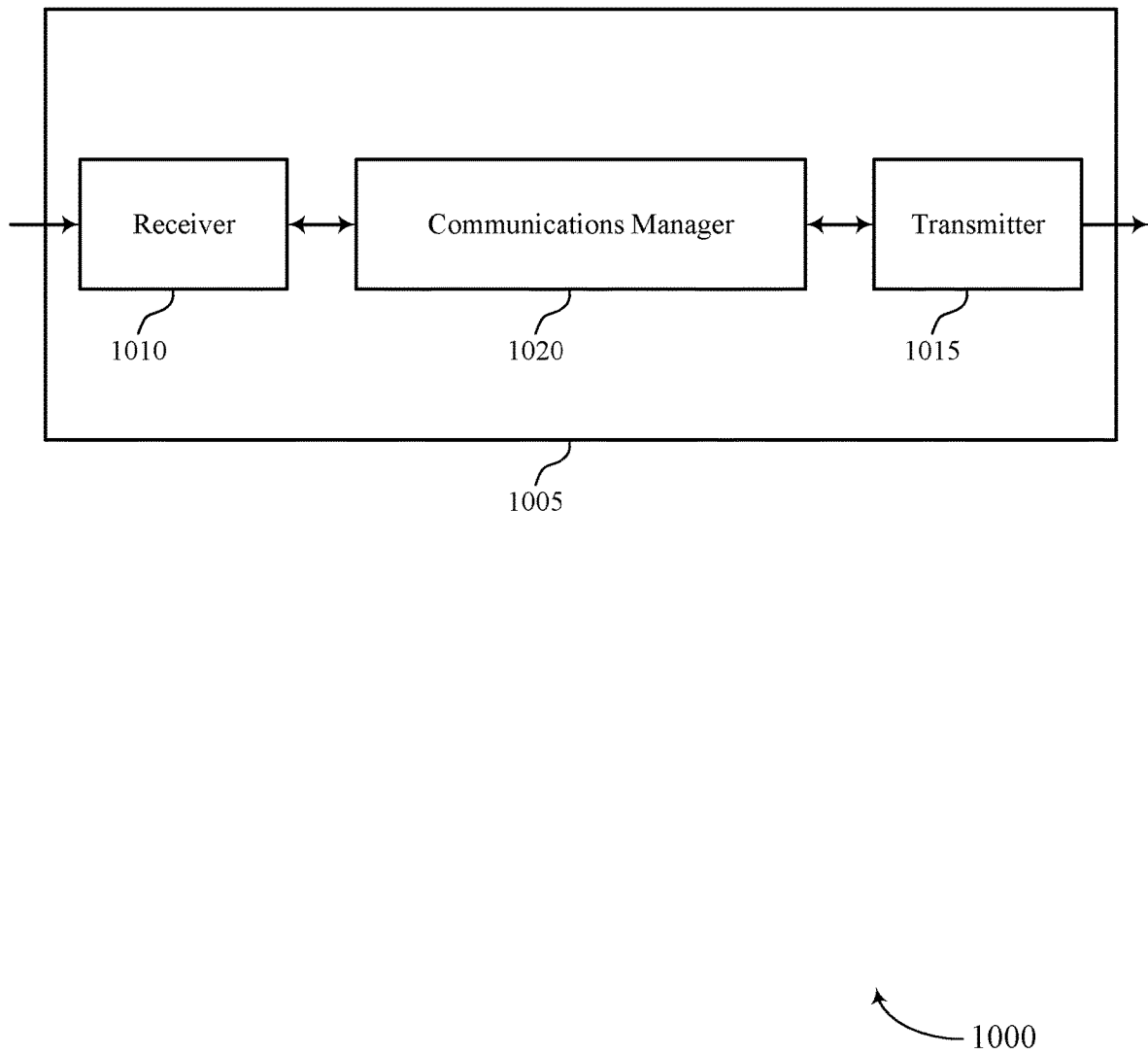
FIGS. 10 and 11 show block diagrams of devices that support duty cycle configuration for power saving in accordance with aspects of the present disclosure.

FIG. 10 shows a block diagram 1000 of a device 1005 that supports duty cycle configuration for power saving in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to duty cycle configuration for power saving). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to duty cycle configuration for power saving). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of duty cycle configuration for power saving as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware, software (e.g., executed by a processor), or any combination thereof. The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a UE, control signaling including an indication of a duty cycle for cycling between a first power state of the UE corresponding to a first configuration and a second power state of the UE corresponding to a second configuration. The communications manager 1020 may be configured as or otherwise support a means for communicating first data traffic with the UE in accordance with the first configuration. The communications manager 1020 may be configured as or otherwise support a means for communicating, after a duration, second data traffic with the UE in accordance with the second configuration, where the duration being in accordance with the duty cycle.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing and more efficient utilization of communication resources. For example, by configuring a UE 115 with a duty cycle for transitioning between power states, the processor of the device 1005 (e.g., a base station 105) may refrain from transmitting DCI for each transition, which may reduce processing, reduce a capacity of a downlink control channel, and thereby improve utilization of communication resources.

Figure 11:
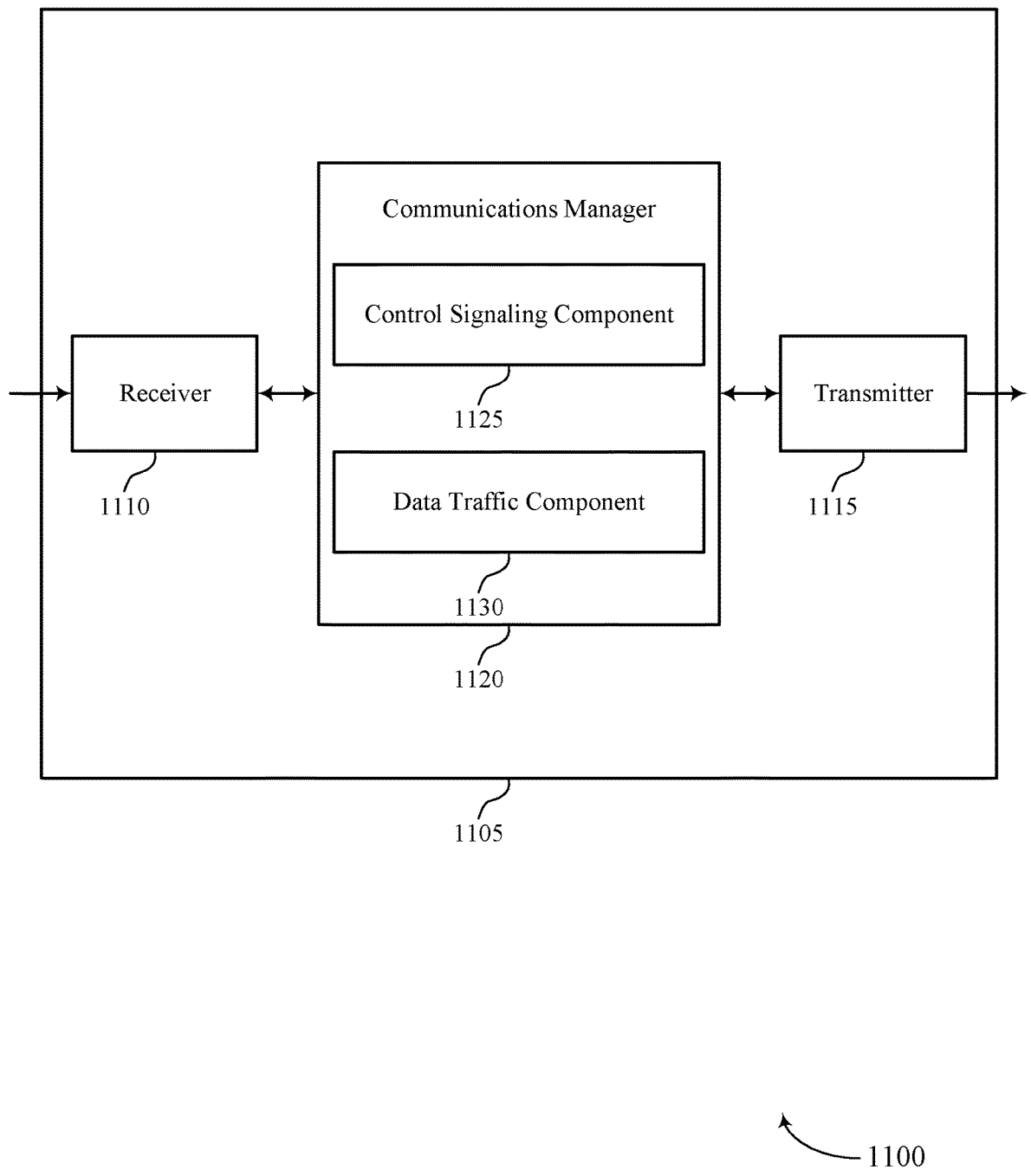

FIG. 11 shows a block diagram 1100 of a device 1105 that supports duty cycle configuration for power saving in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to duty cycle configuration for power saving). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to duty cycle configuration for power saving). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of duty cycle configuration for power saving as described herein. For example, the communications manager 1120 may include a control signaling component 1125 a data traffic component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The control signaling component 1125 may be configured as or otherwise support a means for transmitting, to a UE, control signaling including an indication of a duty cycle for cycling between a first power state of the UE corresponding to a first configuration and a second power state of the UE corresponding to a second configuration. The data traffic component 1130 may be configured as or otherwise support a means for communicating first data traffic with the UE in accordance with the first configuration. The data traffic component 1130 may be configured as or otherwise support a means for communicating, after a duration, second data traffic with the UE in accordance with the second configuration, where the duration is in accordance with the duty cycle.

Figure 12:
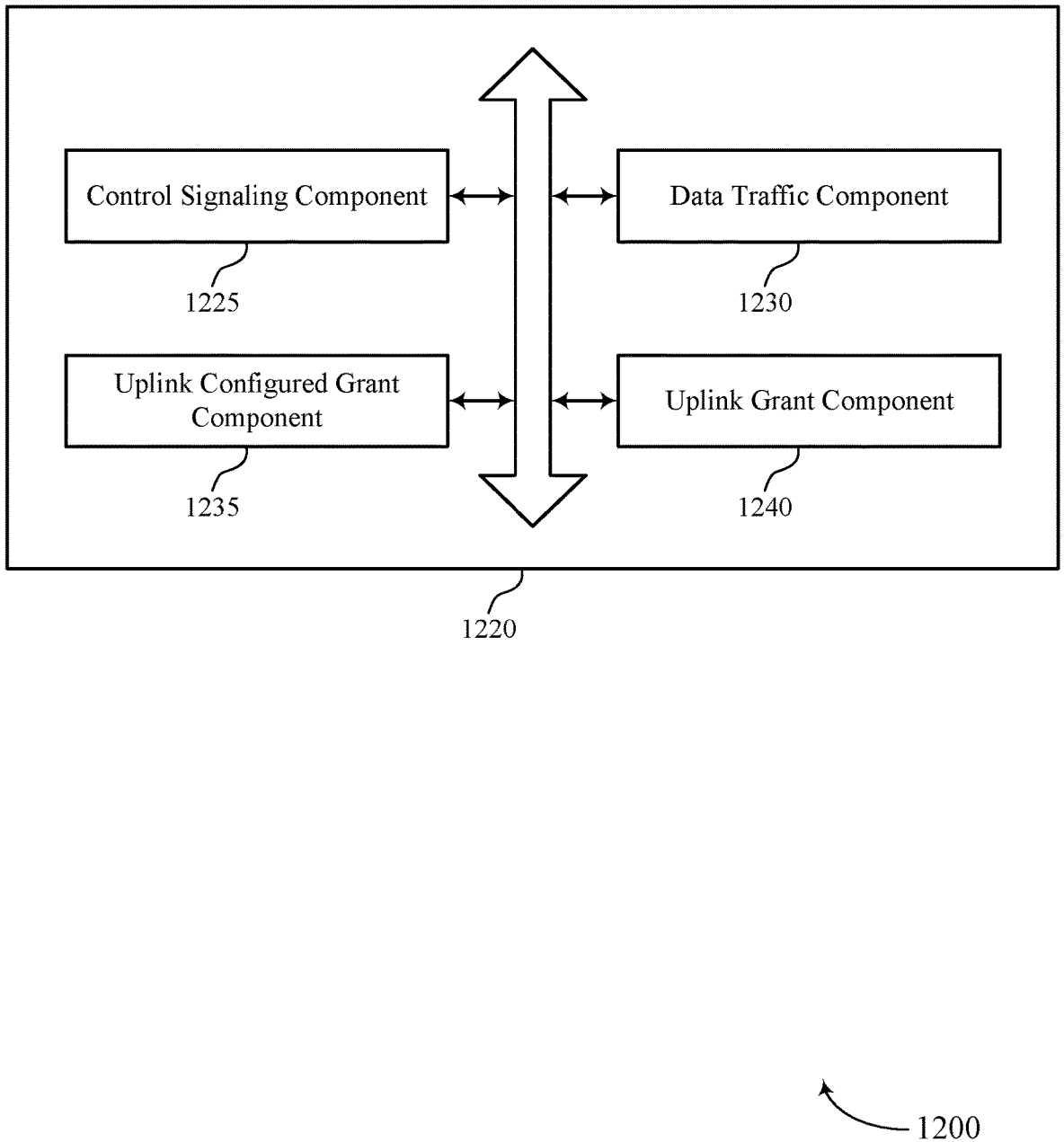
FIG. 12 shows a block diagram of a communications manager that supports duty cycle configuration for power saving in accordance with aspects of the present disclosure.

FIG. 12 shows a block diagram 1200 of a communications manager 1220 that supports duty cycle configuration for power saving in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of duty cycle configuration for power saving as described herein. For example, the communications manager 1220 may include a control signaling component 1225, a data traffic component 1230, an uplink configured grant component 1235, an uplink grant component 1240, or any combination thereof. Each of these components may communicate, directly or indirectly, with one another (e.g., via one or more buses).

The communications manager 1220 may support wireless communication at a base station in accordance with examples as disclosed herein. The control signaling component 1225 may be configured as or otherwise support a means for transmitting, to a UE, control signaling including an indication of a duty cycle for cycling between a first power state of the UE corresponding to a first configuration and a second power state of the UE corresponding to a second configuration. The data traffic component 1230 may be configured as or otherwise support a means for communicating first data traffic with the UE in accordance with the first configuration. In some examples, the data traffic component 1230 may be configured as or otherwise support a means for communicating, after a duration, second data traffic with the UE in accordance with the second configuration, where the duration is in accordance with the duty cycle.

In some examples, the uplink configured grant component 1235 may be configured as or otherwise support a means for transmitting, to the UE, an uplink configured grant indicating one or more sets of periodic uplink resources for transmitting the first data traffic. In some examples, the data traffic component 1230 may be configured as or otherwise support a means for receiving, from the UE operating in the first power state, the first data traffic over an uplink in accordance with the uplink configured grant, where the first power state of the UE is associated with restricted communications via a downlink data channel and a downlink control channel.

In some examples, the uplink grant component 1240 may be configured as or otherwise support a means for transmitting, to the UE operating in the first power state and via a downlink control channel, a first uplink grant of a set of multiple uplink grants in accordance with the first configuration. In some examples, the data traffic component 1230 may be configured as or otherwise support a means for receiving the first data traffic over an uplink in accordance with the first uplink grant, where the first power state of the UE is associated with restricted communications via a downlink data channel.

Figure 13:
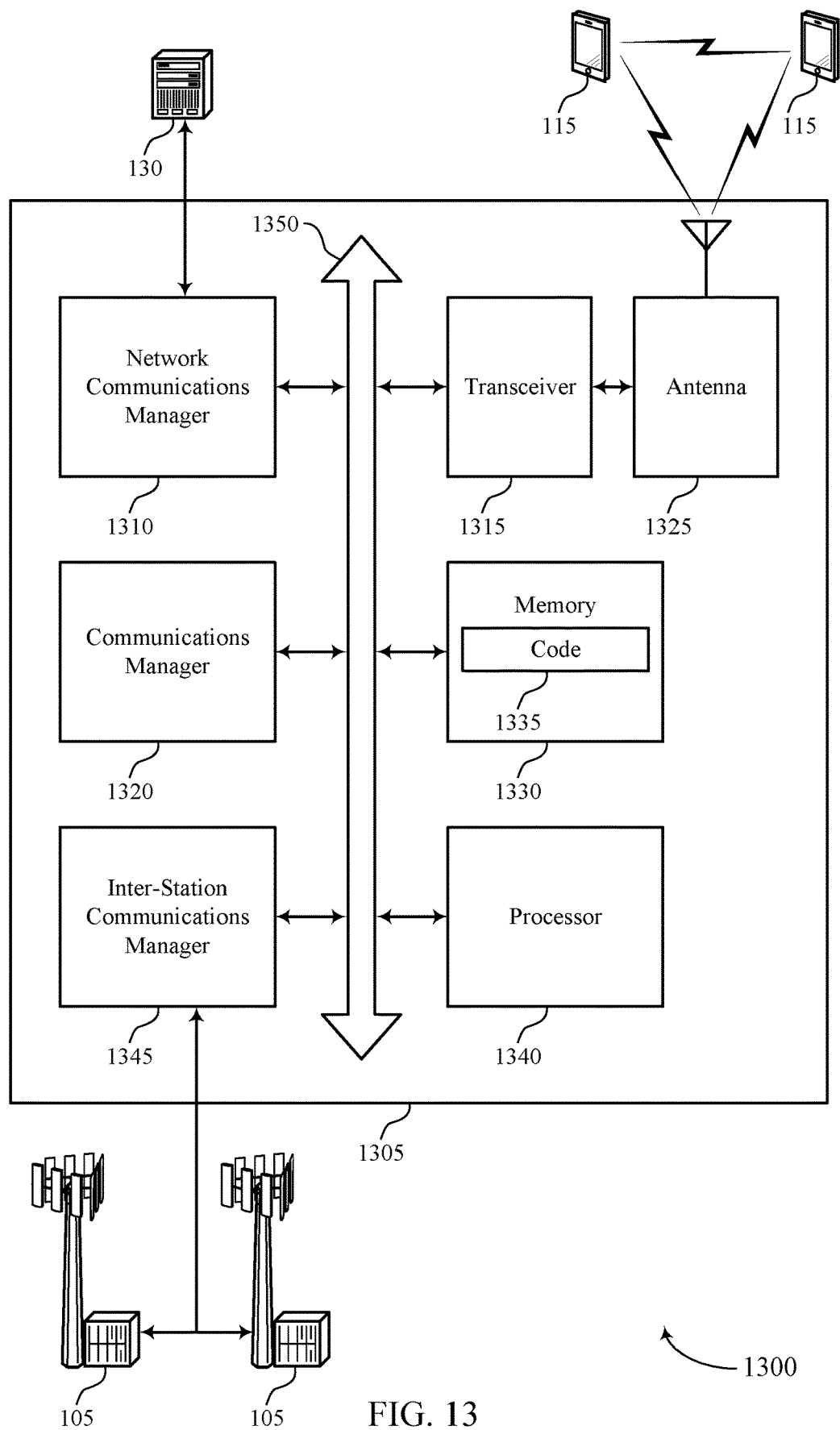
FIG. 13 shows a diagram of a system including a device that supports duty cycle configuration for power saving in accordance with aspects of the present disclosure.

FIG. 13 shows a diagram of a system 1300 including a device 1305 that supports duty cycle configuration for power saving in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting duty cycle configuration for power saving). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a UE, control signaling including an indication of a duty cycle for cycling between a first power state of the UE corresponding to a first configuration and a second power state of the UE corresponding to a second configuration. The communications manager 1320 may be configured as or otherwise support a means for communicating first data traffic with the UE in accordance with the first configuration. The communications manager 1320 may be configured as or otherwise support a means for communicating, after a duration, second data traffic with the UE in accordance with the second configuration, where the duration being in accordance with the duty cycle.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of duty cycle configuration for power saving as described herein, or the processor 1340 and the memory 1330 may be otherwise configured to perform or support such operations.

Figure 14:
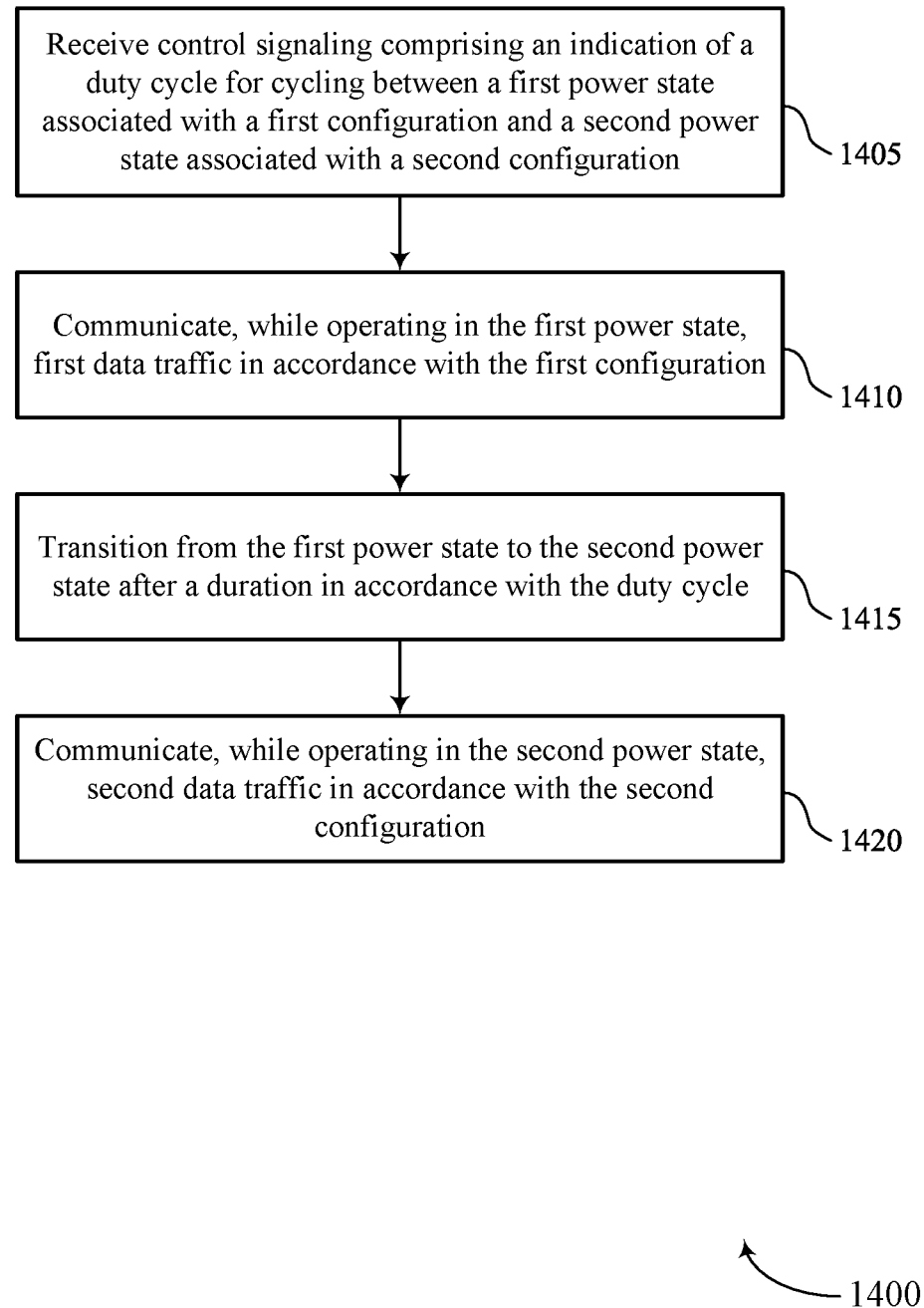
FIGS. 14 through 16 show flowcharts illustrating methods that support duty cycle configuration for power saving in accordance with aspects of the present disclosure.

FIG. 14 shows a flowchart illustrating a method 1400 that supports duty cycle configuration for power saving in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving control signaling comprising an indication of a duty cycle for cycling between a first power state associated with a first configuration and a second power state associated with a second configuration. The operations of 1405 may be performed in accordance with examples as disclosed herein. In some examples, aspects of the operations of 1405 may be performed by a control signaling reception component 825 as described with reference to FIG. 8.

At 1410, the method may include communicating, while operating in the first power state, first data traffic in accordance with the first configuration. The operations of 1410 may be performed in accordance with examples as disclosed herein. In some examples, aspects of the operations of 1410 may be performed by a data traffic component 830 as described with reference to FIG. 8.

At 1415, the method may include transitioning from the first power state to the second power state after a duration in accordance with the duty cycle. The operations of 1415 may be performed in accordance with examples as disclosed herein. In some examples, aspects of the operations of 1415 may be performed by a duty cycle component 835 as described with reference to FIG. 8.

At 1420, the method may include communicating, while operating in the second power state, second data traffic in accordance with the second configuration. The operations of 1420 may be performed in accordance with examples as disclosed herein. In some examples, aspects of the operations of 1420 may be performed by a data traffic component 830 as described with reference to FIG. 8.

Figure 15:
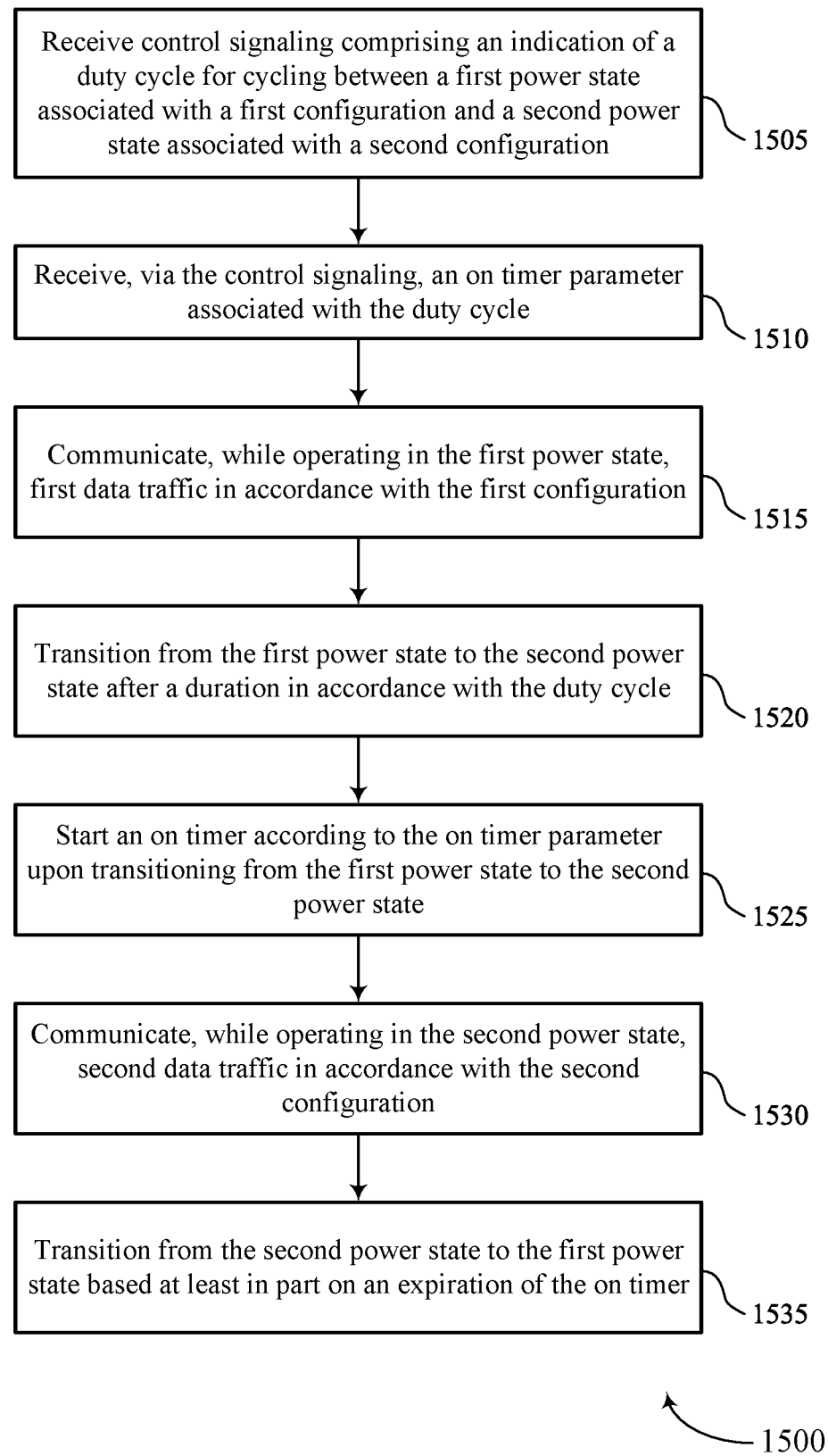

FIG. 15 shows a flowchart illustrating a method 1500 that supports duty cycle configuration for power saving in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving control signaling comprising an indication of a duty cycle for cycling between a first power state associated with a first configuration and a second power state associated with a second configuration. The operations of 1505 may be performed in accordance with examples as disclosed herein. In some examples, aspects of the operations of 1505 may be performed by a control signaling reception component 825 as described with reference to FIG. 8.

At 1510, the method may include receiving, via the control signaling, an on timer parameter associated with the duty cycle. The operations of 1510 may be performed in accordance with examples as disclosed herein. In some examples, aspects of the operations of 1510 may be performed by an on timer component 845 as described with reference to FIG. 8.

At 1515, the method may include communicating, while operating in the first power state, first data traffic in accordance with the first configuration. The operations of 1515 may be performed in accordance with examples as disclosed herein. In some examples, aspects of the operations of 1515 may be performed by a data traffic component 830 as described with reference to FIG. 8.

At 1520, the method may include transitioning from the first power state to the second power state after a duration in accordance with the duty cycle. The operations of 1520 may be performed in accordance with examples as disclosed herein. In some examples, aspects of the operations of 1520 may be performed by a duty cycle component 835 as described with reference to FIG. 8.

At 1525, the method may include starting an on timer according to the on timer parameter upon transitioning from the first power state to the second power state. The operations of 1525 may be performed in accordance with examples as disclosed herein. In some examples, aspects of the operations of 1525 may be performed by an on timer component 845 as described with reference to FIG. 8.

At 1530, the method may include communicating, while operating in the second power state, second data traffic in accordance with the second configuration. The operations of 1530 may be performed in accordance with examples as disclosed herein. In some examples, aspects of the operations of 1530 may be performed by a data traffic component 830 as described with reference to FIG. 8.

At 1535, the method may include transitioning from the second power state to the first power state based at least in part on an expiration of the on timer. The operations of 1535 may be performed in accordance with examples as disclosed herein. In some examples, aspects of the operations of 1535 may be performed by an on timer component 845 as described with reference to FIG. 8.

Figure 16:
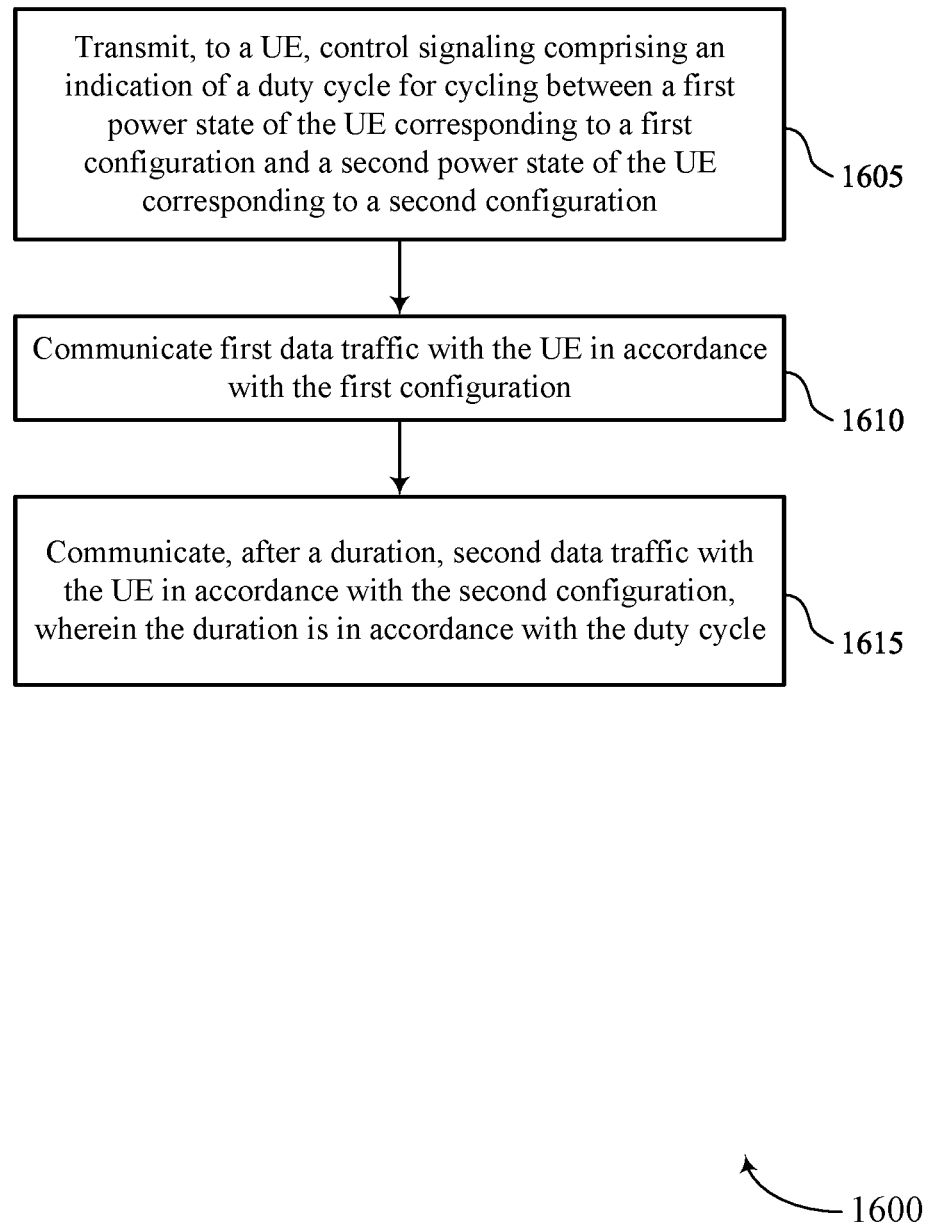

FIG. 16 shows a flowchart illustrating a method 1600 that supports duty cycle configuration for power saving in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, control signaling comprising an indication of a duty cycle for cycling between a first power state of the UE corresponding to a first configuration and a second power state of the UE corresponding to a second configuration. The operations of 1605 may be performed in accordance with examples as disclosed herein. In some examples, aspects of the operations of 1605 may be performed by a control signaling component 1225 as described with reference to FIG. 12.

At 1610, the method may include communicating first data traffic with the UE in accordance with the first configuration. The operations of 1610 may be performed in accordance with examples as disclosed herein. In some examples, aspects of the operations of 1610 may be performed by a data traffic component 1230 as described with reference to FIG. 12.

At 1615, the method may include communicating, after a duration, second data traffic with the UE in accordance with the second configuration, wherein the duration is in accordance with the duty cycle. The operations of 1615 may be performed in accordance with examples as disclosed herein. In some examples, aspects of the operations of 1615 may be performed by a data traffic component 1230 as described with reference to FIG. 12.

The following provides an overview of aspects of the present disclosure:

Aspect 1: A method for wireless communication at a UE, comprising: receiving control signaling comprising an indication of a duty cycle for cycling between a first power state associated with a first configuration and a second power state associated with a second configuration; communicating, while operating in the first power state, first data traffic in accordance with the first configuration; transitioning from the first power state to the second power state after a duration in accordance with the duty cycle; and communicating, while operating in the second power state, second data traffic in accordance with the second configuration.

Aspect 2: The method of aspect 1, wherein each of the first configuration and the second configuration specifies one or more of: a BWP for a PCell, one or more BWPs for one or more SCells, a dormant BWP for the PCell, a dormant BWP for the one or more SCells, restricted reception of a data channel in the BWP for the PCell, restricted reception of a control channel in the BWP for the PCell, restricted reception of the data channel in the one or more BWPs for the one or more SCells, restricted reception of the control channel in the one or more BWPs for the one or more SCells, or a combination thereof.

Aspect 3: The method of any of aspects 1 through 2, further comprising: receiving, via the control signaling, an on timer parameter associated with the duty cycle; starting an on timer according to the on timer parameter upon transitioning from the first power state to the second power state; and transitioning from the second power state to the first power state based at least in part on an expiration of the on timer.

Aspect 4: The method of any of aspects 1 through 2, further comprising: receiving, via the control signaling, an inactivity timer parameter associated with the duty cycle; starting an inactivity timer according to the inactivity timer parameter after communicating the second data traffic; and transitioning from the second power state to the first power state based at least in part on an expiration of the inactivity timer.

Aspect 5: The method of any of aspects 1 through 4, wherein the first power state is associated with restricted reception of one or more of a downlink control channel or a downlink shared channel.

Aspect 6: The method of aspect 5, wherein communicating, while operating in the first power state, the first data traffic comprises: transmitting the first data traffic over an uplink to a base station; and pausing a monitoring of the downlink control channel and the downlink shared channel while operating in the first power state.

Aspect 7: The method of aspect 6, wherein the first configuration comprises an active BWP associated with a PCell and one or more dormant BWPs associated with one or more SCells, wherein the first data traffic is transmitted over the active BWP associated with the PCell.

Aspect 8: The method of any of aspects 6 through 7, further comprising: receiving an uplink configured grant indicating one or more sets of periodic uplink resources for transmitting the first data traffic during the first power state.

Aspect 9: The method of aspect 5, further comprising: receiving, via the downlink control channel while operating in the first power state, a first uplink grant of a plurality of uplink grants in accordance with the first configuration; transmitting the first data traffic in accordance with the first uplink grant; and pausing a monitoring of the downlink shared channel while operating in the first power state.

Aspect 10: The method of any of aspects 1 through 4, wherein the first power state is associated with restricted transmission of one or more of: an uplink control channel or an uplink shared channel.

Aspect 11: The method of aspect 10, wherein communicating, while operating in the first power state, the first data traffic comprises: receiving the first data traffic over a downlink from a base station; and pausing a transmission of the uplink control channel and the uplink shared channel while operating in the first power state.

Aspect 12: The method of any of aspects 1 through 11, further comprising: receiving, while operating in the first power state and the second power state, SSBs, transceiver reception signals, or both.

Aspect 13: The method of any of aspects 1 through 12, wherein the first power state is associated with lower power consumption at the UE than the second power state.

Aspect 14: A method for wireless communication at a base station, comprising: transmitting, to a UE, control signaling comprising an indication of a duty cycle for cycling between a first power state of the UE corresponding to a first configuration and a second power state of the UE corresponding to a second configuration; communicating first data traffic with the UE in accordance with the first configuration; and communicating, after a duration, second data traffic with the UE in accordance with the second configuration, wherein the duration is in accordance with the duty cycle.

Aspect 15: The method of aspect 14, further comprising: transmitting, to the UE, an uplink configured grant indicating one or more sets of periodic uplink resources for transmitting the first data traffic; and receiving, from the UE operating in the first power state, the first data traffic over an uplink in accordance with the uplink configured grant.

Aspect 16: The method of aspect 14, further comprising: transmitting, to the UE operating in the first power state and via a downlink control channel, a first uplink grant of a plurality of uplink grants in accordance with the first configuration; and receiving the first data traffic over an uplink in accordance with the first uplink grant.

Aspect 17: An apparatus for wireless communication at a UE, comprising at least one processor; memory coupled to the at least one processor; and instructions stored in the memory and executable by the at least processor to cause the apparatus to perform a method of any of aspects 1 through 13.

Aspect 18: An apparatus for wireless communication at a UE, comprising at least one means for performing a method of any of aspects 1 through 13.

Aspect 19: A non-transitory computer-readable medium storing code for wireless communication at a UE, the code comprising instructions executable by at least one processor to perform a method of any of aspects 1 through 13.

Aspect 20: An apparatus for wireless communication at a base station, comprising at least one processor; memory coupled to the at least one processor; and instructions stored in the memory and executable by the at least one processor to cause the apparatus to perform a method of any of aspects 14 through 16.

Aspect 21: An apparatus for wireless communication at a base station, comprising at least one means for performing a method of any of aspects 14 through 16.

Aspect 22: A non-transitory computer-readable medium storing code for wireless communication at a base station, the code comprising instructions executable by at least one processor to perform a method of any of aspects 14 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
 at least one processor; and
 memory coupled with the at least one processor, the memory storing instructions executable by the at least one processor to cause the UE to:
  receive control signaling comprising an indication of a duty cycle for cycling between a first power state associated with a first bandwidth part configuration and restricted communications in a first direction and a second power state associated with a second bandwidth part configuration and permitted communications in the first direction;
communicate, while operating in the first power state, first data traffic in a second direction in accordance with the first bandwidth part configuration;
transition from the first power state to the second power state after a duration in accordance with the duty cycle; and
communicate, while operating in the second power state, second data traffic in the first direction, the second direction, or both in accordance with the second bandwidth part configuration.

2. The apparatus of claim 1, wherein each of the first bandwidth part configuration and the second bandwidth part configuration specifies one or more of: a bandwidth part for a primary cell, one or more bandwidth parts for one or more secondary cells, a dormant bandwidth part for the primary cell, a dormant bandwidth part for the one or more secondary cells, restricted reception of a data channel in the bandwidth part for the primary cell, restricted reception of a control channel in the bandwidth part for the primary cell, restricted reception of the data channel in the one or more bandwidth parts for the one or more secondary cells, or restricted reception of the control channel in the one or more bandwidth parts for the one or more secondary cells.

3. The apparatus of claim 1, wherein the instructions are further executable by the at least one processor to cause the UE to:
receive, via the control signaling, an on timer parameter associated with the duty cycle;
start an on timer according to the on timer parameter upon transitioning from the first power state to the second power state; and
transition from the second power state to the first power state based at least in part on an expiration of the on timer.

4. The apparatus of claim 1, wherein the instructions are further executable by the at least one processor to cause the UE to:
receive, via the control signaling, an inactivity timer parameter associated with the duty cycle;
start an inactivity timer according to the inactivity timer parameter after communicating the second data traffic; and
transition from the second power state to the first power state based at least in part on an expiration of the inactivity timer.

5. The apparatus of claim 1, wherein the first power state is associated with restricted reception of one or more of: a downlink control channel or a downlink shared channel, and wherein the first direction comprises a downlink direction.

6. The apparatus of claim 5, wherein the instructions to communicate, while operating in the first power state, the first data traffic are executable by the at least one processor to cause the UE to:
transmit the first data traffic over an uplink to a network device, wherein the second direction comprises an uplink direction; and
pause a monitoring of the downlink control channel and the downlink shared channel while operating in the first power state.

7. The apparatus of claim 6, wherein the first bandwidth part configuration comprises an active bandwidth part associated with a primary cell and one or more dormant bandwidth parts associated with one or more secondary cells, wherein the first data traffic is transmitted over the active bandwidth part associated with the primary cell.

8. The apparatus of claim 6, wherein the instructions are further executable by the at least one processor to cause the UE to:
receive an uplink configured grant indicating one or more sets of periodic uplink resources for transmitting the first data traffic during the first power state.

9. The apparatus of claim 5, wherein the instructions are further executable by the at least one processor to cause the UE to:
receive, via the downlink control channel while operating in the first power state, a first uplink grant of a plurality of uplink grants in accordance with the first bandwidth part configuration;
transmit the first data traffic in accordance with the first uplink grant; and
pause a monitoring of the downlink shared channel while operating in the first power state.

10. The apparatus of claim 1, wherein the first power state is associated with restricted transmission of one or more of: an uplink control channel or an uplink shared channel, and wherein the first direction comprises an uplink direction.

11. The apparatus of claim 10, wherein the instructions to communicate, while operating in the first power state, the first data traffic are executable by the at least one processor to cause the UE to:
receive the first data traffic over a downlink from a network device, wherein the second direction comprises a downlink direction; and
pause a transmission of the uplink control channel and the uplink shared channel while operating in the first power state.

12. The apparatus of claim 1, wherein the instructions are further executable by the at least one processor to cause the UE to:
receive, while operating in the first power state and the second power state, one or more of synchronization signal blocks (SSBs) or transceiver reception signals.

13. The apparatus of claim 1, wherein the first power state is associated with lower power consumption at the UE than the second power state.

14. An apparatus for wireless communication at a network device, comprising:
at least one processor; and
memory coupled with the at least one processor, the memory storing instructions executable by the at least one processor to cause the network device to:
transmit, to a user equipment (UE), control signaling comprising an indication of a duty cycle for cycling between a first power state of the UE corresponding to a first bandwidth part configuration and restricted communications in a first direction and a second power state of the UE corresponding to a second bandwidth part configuration and permitted communications in the first direction;
communicate first data traffic with the UE in a second direction in accordance with the first bandwidth part configuration; and
communicate, after a duration, second data traffic with the UE in the first direction, the second direction, or both in accordance with the second bandwidth part configuration, wherein the duration is in accordance with the duty cycle.

15. The apparatus of claim 14, wherein the instructions are further executable by the at least one processor to cause the network device to:

transmit, to the UE, an uplink configured grant indicating one or more sets of periodic uplink resources for transmitting the first data traffic; and receive, from the UE operating in the first power state, the first data traffic over an uplink in accordance with the uplink configured grant, wherein the first direction comprises a downlink direction and the first power state of the UE is associated with restricted communications via a downlink data channel and a downlink control channel.

16. The apparatus of claim 14, wherein the instructions are further executable by the at least one processor to cause the network device to:

transmit, to the UE operating in the first power state and via a downlink control channel, a first uplink grant of a plurality of uplink grants in accordance with the first bandwidth part configuration; and receive the first data traffic over an uplink in accordance with the first uplink grant, wherein the first direction comprises a downlink direction and the first power state of the UE is associated with restricted communications via a downlink data channel.

17. A method for wireless communication at a user equipment (UE), comprising:

receiving control signaling comprising an indication of a duty cycle for cycling between a first power state associated with restricted communications in a first direction and a first bandwidth part configuration and a second power state associated with permitted communications in the first direction a second bandwidth part configuration;

communicating, while operating in the first power state, first data traffic in a second direction in accordance with the first bandwidth part configuration;

transitioning from the first power state to the second power state after a duration in accordance with the duty cycle; and communicating, while operating in the second power state, second data traffic in a second direction in accordance with the second bandwidth part configuration.

18. The method of claim 17, wherein each of the first bandwidth part configuration and the second bandwidth part configuration specifies one or more of a bandwidth part for a primary cell, one or more bandwidth parts for one or more secondary cells, a dormant bandwidth part for the primary cell, a dormant bandwidth part for the one or more secondary cells, restricted reception of a data channel in the bandwidth part for the primary cell, restricted reception of a control channel in the bandwidth part for the primary cell, restricted reception of the data channel in the one or more bandwidth parts for the one or more secondary cells, or restricted reception of the control channel in the one or more bandwidth parts for the one or more secondary cells.

19. The method of claim 17, further comprising:

receiving, via the control signaling, an on timer parameter associated with the duty cycle;

starting an on timer according to the on timer parameter upon transitioning from the first power state to the second power state; and transitioning from the second power state to the first power state based at least in part on an expiration of the on timer.

20. The method of claim 17, further comprising:

receiving, via the control signaling, an inactivity timer parameter associated with the duty cycle;

starting an inactivity timer according to the inactivity timer parameter after communicating the second data traffic; and transitioning from the second power state to the first power state based at least in part on an expiration of the inactivity timer.

21. The method of claim 17, wherein the first power state is associated with restricted reception of one or more of: a downlink control channel or a downlink shared channel, and wherein the first direction comprises a downlink direction.

22. The method of claim 21, wherein communicating, while operating in the first power state, the first data traffic comprises:

transmitting the first data traffic over an uplink to a network device, wherein the second direction comprises an uplink direction; and pausing a monitoring of the downlink control channel and the downlink shared channel while operating in the first power state.

23. The method of claim 22, wherein the first bandwidth part configuration comprises an active bandwidth part associated with a primary cell and one or more dormant bandwidth parts associated with one or more secondary cells, wherein the first data traffic is transmitted over the active bandwidth part associated with the primary cell.

24. The method of claim 22, further comprising:

receiving an uplink configured grant indicating one or more sets of periodic uplink resources for transmitting the first data traffic during the first power state.

25. The method of claim 21, further comprising:

receiving, via the downlink control channel while operating in the first power state, a first uplink grant of a plurality of uplink grants in accordance with the first bandwidth part configuration;

transmitting the first data traffic in accordance with the first uplink grant; and pausing a monitoring of the downlink shared channel while operating in the first power state.

26. The method of claim 17, wherein the first power state is associated with restricted transmission of one or more of: an uplink control channel or an uplink shared channel, and wherein the first direction comprises an uplink direction.

27. The method of claim 26, wherein communicating, while operating in the first power state, the first data traffic comprises:

receiving the first data traffic over a downlink from a network device, wherein the second direction comprises a downlink direction; and pausing a transmission of the uplink control channel and the uplink shared channel while operating in the first power state.

28. The method of claim 17, further comprising:

receiving, while operating in the first power state and the second power state, one or more of synchronization signal blocks (SSBs) or transceiver reception signals.

29. The method of claim 17, wherein the first power state is associated with lower power consumption at the UE than the second power state.

30. A method for wireless communication at a network device, comprising:

transmitting, to a user equipment (UE), control signaling comprising an indication of a duty cycle for cycling between a first power state of the UE corresponding to a first bandwidth part configuration and restricted communications in a first direction and a second power state of the UE corresponding to a second bandwidth part configuration and permitted communications in the first direction;

communicating first data traffic with the UE in a second direction in accordance with the first bandwidth part configuration; and communicating, after a duration, second data traffic with the UE in the first direction, the second direction, or both in accordance with the second bandwidth part configuration, wherein the duration is in accordance with the duty cycle.

* * * * *